(12) United States Patent
Nakao et al.

(10) Patent No.: US 7,443,341 B2
(45) Date of Patent: Oct. 28, 2008

(54) METHOD FOR DERIVING WEIGHT VECTORS TO BE USED AT THE TIME OF TRANSMITTING SIGNALS FROM A PLURALITY OF ANTENNAS, AND TRANSMITTING APPARATUS AND COMMUNICATION SYSTEM UTILIZING SAID METHOD

(75) Inventors: Seigo Nakao, Gifu (JP); Yasutaka Ogawa, Sapporo (JP); Takeo Ohgane, Sapporo (JP); Toshihiko Nishimura, Sapporo (JP); Hiroshi Nishimoto, Sapporo (JP)

(73) Assignees: Sanyo Electric Co., Ltd., Osaka (JP); National University Corporation Hokkaido University, Hokkaido (JP)

(*) Notice: Subject to any disclaimer, the term of this patent is extended or adjusted under 35 U.S.C. 154(b) by 0 days.

(21) Appl. No.: 11/806,488

(22) Filed: May 31, 2007

(65) Prior Publication Data
US 2007/0280367 A1 Dec. 6, 2007

(30) Foreign Application Priority Data
May 31, 2006 (JP) ............................. 2006-151200

(51) Int. Cl.
*H01Q 3/00* (2006.01)
*H04K 1/10* (2006.01)
(52) U.S. Cl. ...................................... 342/377; 375/260
(58) Field of Classification Search .................. 342/58, 342/367, 377, 378, 382; 455/260, 267, 343
See application file for complete search history.

(56) References Cited

U.S. PATENT DOCUMENTS

| | | | |
|---|---|---|---|
| 2004/0178954 A1* | 9/2004 | Vook et al. | 342/383 |
| 2006/0013326 A1* | 1/2006 | Yoshida | 375/260 |
| 2006/0067207 A1* | 3/2006 | Miyoshi | 370/210 |
| 2006/0068718 A1* | 3/2006 | Li et al. | 455/69 |
| 2006/0120471 A1* | 6/2006 | Learned et al. | 375/260 |
| 2006/0140297 A1* | 6/2006 | Maltsev et al. | 375/260 |

OTHER PUBLICATIONS

Kudo et al., "Beamforming Method for Reducing Operational Load at the Transmitter for MIMO-OFDM Systems," IEICE Technical Report, the Institute of Electronics, Information and Communication Engineers, Oct. 2005.

* cited by examiner

*Primary Examiner*—Dao L Phan
(74) *Attorney, Agent, or Firm*—McDermott Will & Emery LLP

(57) ABSTRACT

A plurality of antennas transmit multicarrier signals composed of a plurality of streams. An IF unit acquires, per carrier, a channel matrix having elements the number of which is determined by the number of a plurality of transmitting antennas and the number of a plurality of receiving antennas provided in a receiving apparatus. A baseband processing unit derives a common autocorrelation matrix for the channel matrix acquired per carrier. The baseband processing unit derives a steering matrix by eigenvalue-decomposing the derived common autocorrelation matrix. The baseband processing unit derives, per carrier, weight vectors for a plurality of streams in a manner such that an orthonormalization is performed respectively on matrices obtained by operating the derived steering matrix on the channel matrix per carrier.

7 Claims, 19 Drawing Sheets

| L-STF | L-LTF | L-SIG | HT-SIG | HT-STF | HT-LTF | -HT-LTF | HT-LTF | -HT-LTF | DATA 1 |
| L-STF -50ns | L-LTF -50ns | L-SIG -50ns | HT-SIG -50ns | HT-STF -400ns | HT-LTF -400ns | HT-LTF -400ns | HT-LTF -400ns | HT-LTF -400ns | DATA 2 -400ns |
| L-STF -100ns | L-LTF -100ns | L-SIG -100ns | HT-SIG -100ns | HT-STF -200ns | HT-LTF -200ns | -HT-LTF -200ns | -HT-LTF -200ns | HT-LTF -200ns | DATA 3 -200ns |
| L-STF -150ns | L-LTF -150ns | L-SIG -150ns | HT-SIG -150ns | HT-STF -600ns | HT-LTF -600ns | HT-LTF -600ns | -HT-LTF -600ns | -HT-LTF -600ns | DATA 4 -600ns |

FIG.12

| MIMO SYSTEM ($N_T \times N_R$) | $2 \times 2, 4 \times 4$ |
|---|---|
| CHANNEL INFORMATION | KNOWN AT RECEIVING AND TRANSMITTING SIDES |
| THE NUMBER OF SUBCARRIERS | 56 SUBCARRIERS OUT OF 64 SUBCARRIERS |
| DATA BLOCK LENGTH Q (FFT SIZE) | 64 POINTS |
| GI LENGTH | 16 POINTS |
| THE NUMBER OF OFDM SYMBOLS | 9 |
| NUMBER OF TRANSMISSION BITS | $2N_T \times 56 \times 9$ BITS PER FRAME (CODING BITS AT CODING) |
| MODULATION SCHEME | QPSK, 16QAM, 64QAM, 256QAM (QPSK, 16QAM IN $2 \times 2$ MIMO) |
| RECEIVING PROCESSING | MMSE FILTERING |
| ERROR CORRECTING CODE (AT THE TIME OF CODING) | CONVOLUTIONAL CODING (CONSTRAINT LENGTH:3, CODING RATE:1/2) |
| DECODING (AT THE TIME OF CODING) | SOFT-DECISION Viterbi DECODING |
| FADING | SEMI-STATIC i.i.d. RAYLEIGH FADING |
| THE NUMBER OF PATHS | 16 (FOR EACH SAMPLING INTERVAL) |
| DELAY PROFILE | EXPONENTIALLY DECAY BY 1[dB], ON AVERAGE, PER SAMPLE |
| THE NUMBER OF FRAMES TRANSMITTED | 100,000 |

METHOD FOR DERIVING WEIGHT VECTORS TO BE USED AT THE TIME OF TRANSMITTING SIGNALS FROM A PLURALITY OF ANTENNAS, AND TRANSMITTING APPARATUS AND COMMUNICATION SYSTEM UTILIZING SAID METHOD

CROSS-REFERENCE TO RELATED APPLICATIONS

This application is based upon and claims the benefit of priority from the prior Japanese Patent Application No. 2006-151200, filed May 31, 2006, the entire contents of which are incorporated herein by reference.

BACKGROUND OF THE INVENTION

1. Field of the Invention

The present invention relates to a technology used to derive weight vectors, and it particularly relates to a method for deriving weight vectors to be used at the time of transmitting signals from a plurality of antennas, and a transmitting apparatus and a communication system utilizing said method.

2. Description of the Related Art

One of techniques to realize a higher quality and a higher data transmission rate in a wireless communication system is a MIMO (Multiple-Input Multiple-Output) system. In this MIMO system, a transmitting apparatus and a receiving apparatus are each equipped with a plurality of antennas, and a plurality of channels corresponding respectively to the antennas are set. Accordingly, channels up to the maximum number of antennas are set for the communications between the transmitting apparatus and the receiving apparatus so as to achieve a high data transmission rate. Of such MIMO systems, a MIMO eigenmode system can increase the channel capacity. In the MIMO eigenmode system, derived is a channel matrix (hereinafter referred to as "H matrix") which is generated from values of channel characteristics between a plurality of antennas provided in the transmitting apparatus and those in the receiving apparatus. Then, eigenbeams corresponding to orthogonal channels the number of which is equal to the rank of an H matrix are formed in the MIMO eigenmode system. In so doing, the eigenbeams corresponding respectively to the orthogonal channels are formed.

An OFDM (Orthogonal Frequency Division Multiplexing) modulation scheme is one of multicarrier schemes that can realize the high-speed data transmission and are robust in the multipath environment. This OFDM modulation scheme is effective in countermeasuring the delay path. Also, when the MIMO eigenmode system is combined with the OFDM modulation scheme, the eigenbeam is formed on a subcarrier-by-subcarrier basis. In general, an eigenvector derived as a result of an eigenvalue operation per subcarrier does not have continuity among subcarriers. When the transmission is performed using weights having less continuity between the subcarriers, namely, in the frequency domain, there are cases where an impulse response of an equivalent channel observed at a receiving side has a delay spread.

On the other hand, when there is no transmission directivity, the estimation of a channel having the delay spread is done satisfactorily in the time domain. This corresponds to improving an SNR (Signal-to-Noise Ratio) by restricting an estimation interval within a guard interval if the impulse response of channels outside the guard interval gets smaller. Nevertheless, the impulse response in the MIMO eigenmode system as described above has a delay spread beyond the guard interval. Then, it is difficult to perform the estimation in the time domain, so that it is important to maintain the continuity of weights in the frequency domain.

The receiving apparatus generally estimates the channel characteristics from received signals, and carries out demodulation per subcarrier based on the estimated channel characteristics. Here, the receiving apparatus reduces the effect of noise contained in the estimated characteristics in order to improve the receiving characteristics of the signals. For example, the receiving apparatus performs smoothing processing in the time domain or smoothing processing in the frequency domain. However, as described above, the correlation in the signals in the frequency domain gets smaller in the MIMO eigenmode system. For such signals, if the smoothing processing in the frequency domain is performed, the orthogonal channel will not be formed. Accordingly, a receiving apparatus compatible with the MIMO eigenmode system cannot perform the smoothing processing in the frequency domain and therefore cannot reduce the effect of noise.

SUMMARY OF THE INVENTION

The present invention has been made in view of the foregoing circumstances and a general purpose thereof is to provide a technology realizing a performance equivalent to a MIMO eigenmode transmission while the continuity of weight vectors in the frequency domain is maintained.

In order to resolve the above problems, a transmitting apparatus according to one embodiment of the present invention comprises: a plurality of transmitting antennas which transmit multicarrier signals composed of a plurality of streams; an acquisition unit which acquires, per carrier, a channel matrix having elements the number of which is determined by the number of the plurality of transmitting antennas and the number of a plurality of receiving antennas provided in a receiving apparatus wherein values of the elements represent channel characteristics between the plurality of transmitting antennas and the plurality of receiving antennas, respectively; a first derivation unit including a means which derives a common autocorrelation matrix for the channel matrix acquired by the acquisition unit per carrier and a means which derives a steering matrix by eigenvalue-decomposing the derived common autocorrelation matrix; a second derivation unit which derives, per carrier, weight vectors for a plurality of streams in a manner such that an orthonormalization is performed respectively on matrices obtained by operating the steering matrix derived by the first derivation unit on the channel matrix per carrier; and a transmitter which transmits, from the plurality of transmitting antennas, the multicarrier signals composed of a plurality of streams by using the weight vectors derived by the second derivation unit.

"Operating" is equivalent to multiplication and the like, and the operation of Hermitian transpose or the like may be performed in the multiplication. One example of "orthonormalization, for maintaining continuity of channels in a frequency domain" is Gram-Schmidt orthonormalization.

Another embodiment of the present invention relates to a method for deriving weight vectors. This method comprises: acquiring, per carrier, a channel matrix having elements the number of which is determined by the number of a plurality of transmitting antennas and the number of a plurality of receiving antennas provided in a receiving apparatus wherein values of the elements represent channel characteristics between the plurality of transmitting antennas and the plurality of receiving antennas, respectively; deriving a common autocorrelation matrix for the acquired channel matrix per carrier;

deriving a steering matrix by eigenvalue-decomposing the derived common autocorrelation matrix; and deriving, per carrier, weight vectors in a manner such that an orthonormalization is performed respectively on matrices obtained by operating the steering matrix on the channel matrix per carrier.

Still another embodiment of the present invention relates to a communication system. This communication system comprises: a transmitting apparatus which transmits multicarrier signals, composed of a plurality of streams, by a plurality of transmitting antennas; and a receiving apparatus which receives the multicarrier signals, composed of a plurality of streams, by a plurality of receiving antennas. The transmitting apparatus includes: an acquisition unit which acquires, per carrier, a channel matrix having elements the number of which is determined by the number of the plurality of transmitting antennas and the number of a plurality of receiving antennas wherein values of the elements represent channel characteristics between the plurality of transmitting antennas and the plurality of receiving antennas, respectively; a first derivation unit including a means which derives a common autocorrelation matrix for the channel matrix acquired by the acquisition unit per carrier and a means which derives a steering matrix by eigenvalue-decomposing the derived common autocorrelation matrix; a second derivation unit which derives, per carrier, weight vectors for a plurality of streams in a manner such that an orthonormalization is performed respectively on matrices obtained by operating the steering matrix derived by the first derivation unit on the channel matrix per carrier; and a transmitter which transmits, from the plurality of transmitting antennas, the multicarrier signals composed of a plurality of streams by using the weight vectors derived by the second derivation unit.

It is to be noted that any arbitrary combination of the aforementioned constituting elements, and the implementation of the present invention in the form of a method, an apparatus, a system, a recording medium, a computer program and so forth may also be effective as and encompassed by the embodiments of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIG. 12 shows simulation data;

DETAILED DESCRIPTION OF THE INVENTION

The invention will now be described by reference to the preferred embodiments. This does not intend to limit the scope of the present invention, but to exemplify the invention.

Before describing the present invention in detail, an outline of the present invention will be described first. Exemplary embodiments according to the present invention relate to a MIMO system comprised of at least two radio apparatuses. A transmitting side in the radio apparatuses (hereinafter referred to as "transmitting apparatus") is compatible with a MIMO eigenmode transmission. In the MIMO eigenmode transmission, a correlation among subcarriers in multicarrier signals transmitted is generally small to an extent, and a delay spread in impulse responses is generally large. On the other hand, a receiving side in the radio apparatuses (hereinafter referred to as "receiving apparatus") receives the multicarrier signals. In so doing, if the delay spread becomes larger than a guard interval duration, there may be cases where the receiving characteristics deteriorate.

To enhance receiving characteristics, a receiving apparatus performs processing for suppressing noise contained in the received multicarrier signals. More specifically, a smoothing processing among subcarriers is performed on channel characteristics to demodulate the received multicarrier signals. When such processing is performed during the MIMO eigenmode transmission, there are cases where the receiving characteristics deteriorate. In order to have a relatively high correlation even in the MIMO eigenmode transmission, a transmitting processing and a receiving processing will be performed as follows in the present exemplary embodiments.

The receiving apparatus estimates channel characteristics corresponding respectively to a combination of a plurality of antennas of the transmitting apparatus and a plurality of antennas of the receiving apparatus. The channel characteristics corresponding respectively to the combination as described above are put together in the form of a matrix and hereinafter such a matrix will be referred to as "H matrix". The H matrix is derived on a subcarrier-by-subcarrier basis. When deriving an autocorrelation matrix for the H matrix subcarrier by subcarrier, the transmitting apparatus derives a matrix representing the summation thereof. Also, the transmitting apparatus derives a steering matrix by eigenvalue-decomposing the summation matrix. The transmitting apparatus performs Gram-Schmidt orthonormalization on a matrix generated from the H matrix per subcarrier and the steering matrix so as to derive a weight vector per subcarrier.

Figure 1:
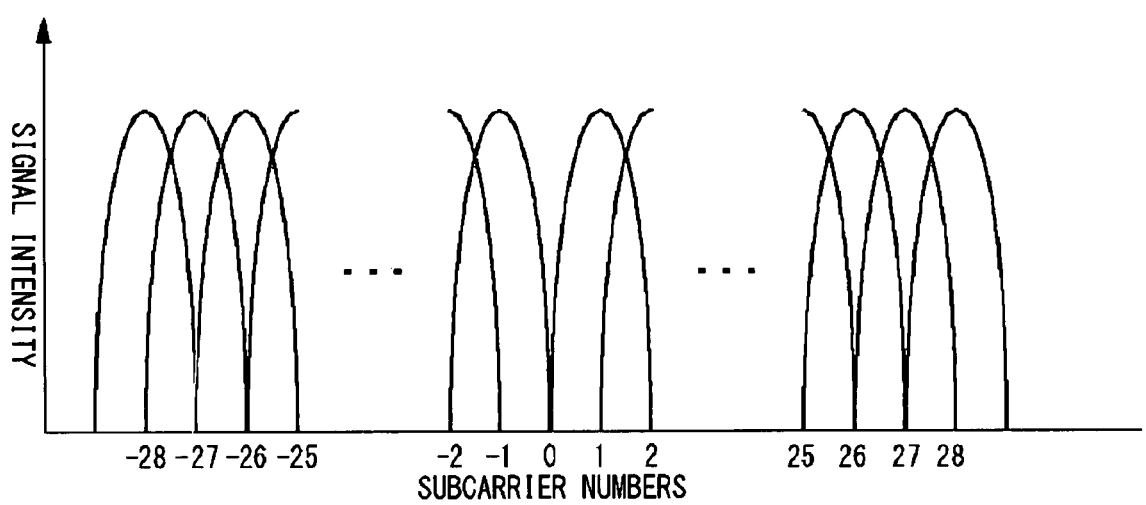
FIG. 1 illustrates a spectrum of a multicarrier signal according to an exemplary embodiment of the present invention.

FIG. 1 illustrates a spectrum of a multicarrier signal according to an exemplary embodiment of the present invention. In particular, FIG. 1 shows a spectrum of a signal in an OFDM modulation scheme. One of a plurality of carriers in the OFDM modulation scheme is generally called a subcarrier. Herein, however, a subcarrier is designated by a "subcarrier number". In a MIMO system, 56 subcarriers, namely, subcarrier numbers "−28" to "28" are defined. It is to be noted that the subcarrier number "0" is set to null so as to reduce the effect of a direct current component in a baseband. The unit of a signal in the time domain which also serves as the unit of a signal constituted by a plurality of subcarriers is called "OFDM symbol" here.

The respective subcarriers are modulated by a modulation scheme which is set variably. Used here is any of modulation schemes among BPSK (Binary Phase-Shift Keying), QPSK (Quadrature Phase-Shift Keying), 16-QAM (Quadrature Amplitude Modulation) and 64-QAM.

As an error correction scheme, convolutional coding is used for these signals. The coding rates for the convolutional coding are set to ½, ¾ and so forth. The number of data to be transmitted in parallel is set variably. As a result thereof, since the mode of modulation scheme, the coding rate and the number of streams are set variably, the data rate is also set variably. It is to be noted that the "data rate" may be determined by arbitrary combination of these factors or by one of them.

Figure 2:
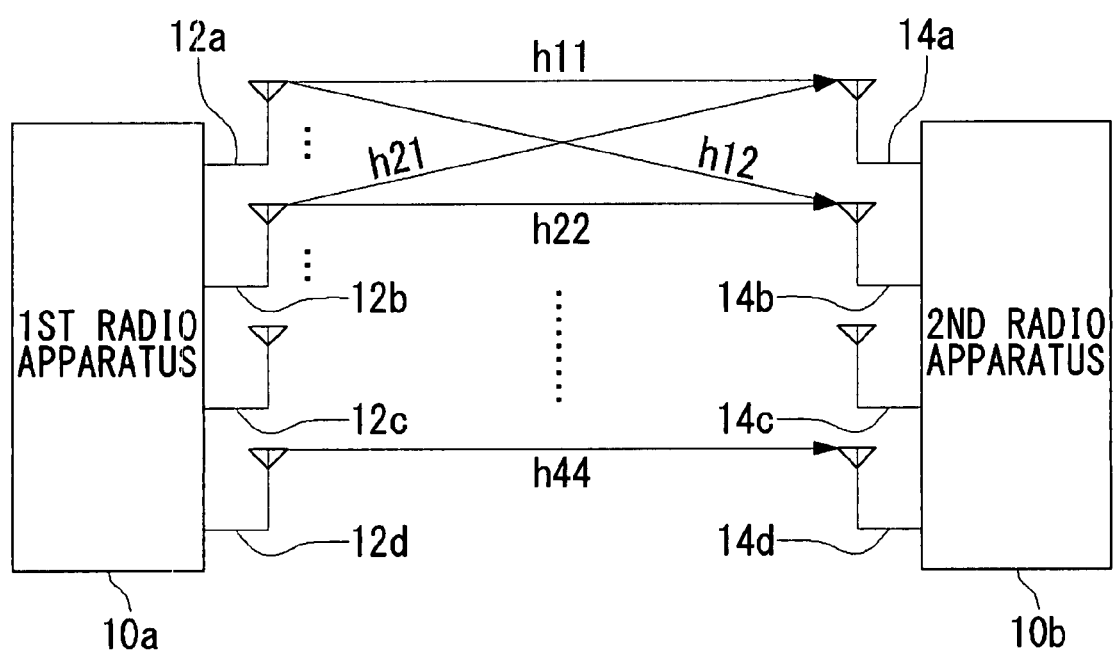
FIG. 2 illustrates a structure of a communication system according to an exemplary embodiment of the present invention.

FIG. 2 illustrates a structure of a communication system 100 according to an embodiment of the present invention. The communication system 100 includes a first radio apparatus 10a and a second radio apparatus 10b, which are generically referred to as "radio apparatus 10". The first radio apparatus 10a includes a first antenna 12a, a second antenna 12b, a third antenna 12c and a fourth antenna 12d, which are generically referred to as "antennas 12". The second radio apparatus 10b includes a first antenna 14a, a second antenna 14b, a third antenna 14c and a fourth antenna 14d, which are generically referred to as "antennas 14". Here, the first radio apparatus 10a corresponds to a transmitting apparatus, whereas the second radio apparatus 10b corresponds to a receiving apparatus.

An outline of a MIMO system will be explained before the description of a structure of the communication system 100. Assume herein that data are being transmitted from the first radio apparatus 10a to the second radio apparatus 10b. The first radio apparatus 10a transmits respectively multicarrier signals composed of multiple streams from the first antenna 12a to the fourth antenna 12d, respectively. As a result, the data rate becomes higher. Note that the first radio apparatus 12a can execute MIMO eigenmode transmission. The second radio apparatus 10b receives the multicarrier signals composed of multiple streams by the first antenna 14a to the fourth antenna 14d. The second radio apparatus 10b separates the received data by adaptive array signal processing and demodulates independently the data of multiple streams. The second radio apparatus 10b derives an H matrix and conveys the thus derived H matrix to the first radio apparatus 10a. While forming eigenbeams based on the received H matrix, the first radio apparatus 10a transmits the multicarrier signals.

Since the number of antennas 12 is "4" and the number of antennas 14 is also "4" here, the number of combinations of channels between the antennas 12 and the antennas 14 is "16". The channel characteristic between from the ith antenna 12i to the jth antenna 14j is denoted by $h_{ij}$. In FIG. 2, the channel characteristic between the first antenna 12a and the first antenna 14a is denoted by $h_{11}$, that between from the first antenna 12a to the second antenna 14b by $h_{12}$, that between the second antenna 12b and the first antenna 14a by $h_{21}$, that between from the second antenna 12b to the second antenna 14b by $h_{22}$, and that between from the fourth antenna 12d to the fourth antenna 14d by $h_{44}$. For the clarity of illustration, the other channels are omitted in FIG. 2.

Figures 3A, 3B:
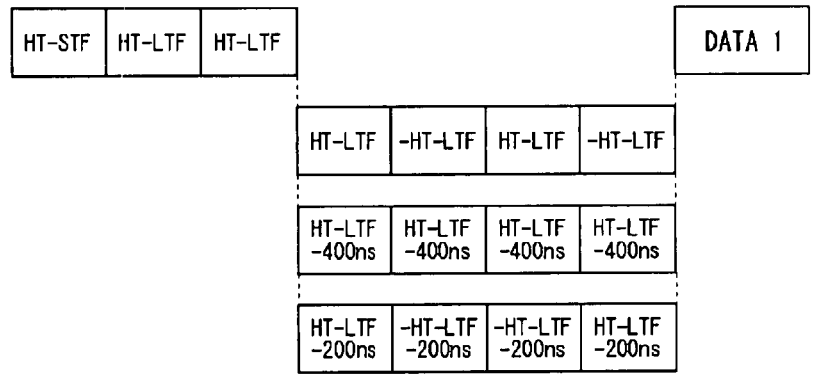
FIGS. 3A and 3B illustrate packet formats in a communication system shown in FIG. 2.

FIGS. 3A and 3B show packet formats in a communication system 100. FIG. 3A represents a case where the number of streams is "4". In FIG. 3A, it is assumed that data contained in four streams are to be transmitted, and packet formats corresponding to the first to fourth streams are shown in order from top row to bottom row. In the packet signal corresponding to the first stream, "L-STF", "HT-LTF" and the like are assigned as preamble signals. "L-STF", "L-LTF", "L-SIG", and "HT-SIG" correspond to a known signal for AGC setting, a known signal for channel estimation and a control signal compatible with a legacy system, and a control signal compatible with a MIMO system, respectively. The legacy system is a system which is not compatible with a MIMO system. Used in the legacy system are 52 subcarriers, namely, subcarrier numbers "−26" to "26" in the spectra shown in FIG. 1. One example of the legacy systems is a wireless LAN complying with the IEEE802.11a standard.

The control signal compatible with a MIMO system has, for example, information on the number of streams and the destination of data signals. "HT-STF" and "HT-LTF" correspond to a known signal for AGC setting and a known signal, for channel estimation, compatible with a MIMO system, respectively. On the other hand, "Data 1" to "Data 4" are data signals. Note that L-LTF and HT-LTF are used not only for AGC setting but also for timing estimation.

In the packet signal corresponding to the second stream, "L-STF(−50 ns)", "HT-LTF(−400 ns)" and the like are assigned as preamble signals. In the packet signal corresponding to the third stream, "L-STF(−100 ns)", "HT-LTF(−200 ns)" and the like are assigned as preamble signals. In the packet signal corresponding to the fourth stream, "L-STF(−150 ns)", "HT-LTF(−600 ns)" and the like are assigned as preamble signals.

Here, "−400 ns" and the like indicate the amounts of timing shift in CDD (Cyclic Delay Diversity). The CDD is a processing where in a predetermined interval a time-domain waveform is shifted, by a shift amount, in a posterior direction and then the waveform pushed out of the rearmost part in the predetermined interval is assigned cyclically in a header portion of the predetermined interval. That is, "L-STF(−50 ns)" is "L-STF" given a cyclic timing shift by a delay of −50 ns. Assume herein that L-STF and HT-STF are each structured by a repetition of an 800 ns duration and that the other parts such as HT-LTF are each constituted by a repetition of a 3.2 µs duration. Here, the CDD is also applied to "Data 1" to "Data 4" and the amounts of timing shift are of the same values as those for HT-LTFs assigned anterior thereto.

In the first stream, HT-LTFs are assigned in the order of "HT-LTF", "−HT-LTF", "HT-LTF" and "−HT-LTF" from the top. Here, these in this order are called "a first component", "a second component", "a third component" and "a fourth component" in all of the streams. A receiving apparatus extracts a desired signal for the first stream by computing "first component minus (−) second component plus (+) third component minus (−) fourth component" for received signals of all the streams. The receiving apparatus extracts a desired signal for the second stream by computing "first component+second component+third component+fourth component" for received signals of all the streams. Also, the receiving apparatus extracts a desired signal for the third stream by computing "first component−second component−third component+fourth component" for received signals of all the streams. Also, the receiving apparatus extracts a desired signal for the fourth stream by computing "first component+second component−third component−fourth component" for received signals of all the streams. These correspond to the fact that the combination of the signs of predetermined components has an orthogonal relationship among the streams. Note that the addition and subtraction processing are done by vector operation.

In FIG. 3A, the sign of "HT-LTF" is defined as follows. The signs are arranged in order from the top of the first stream as "+ (plus)", "− (minus)", "+" and "−"; the signs are arranged in order from the top of the second stream as "+", "+", "+" and "+"; the signs are arranged in order from the top of the third stream as "+", "−", "−" and "+"; and the signs are arranged in order from the top of the fourth stream as "+", "+", "−" and "−". However, the signs may be defined as follows. That is, the signs are arranged in order from the top of the first stream as "+", "−", "+" and "+"; the signs are arranged in order from the top of the second stream as "+", "+", "−" and "+"; the signs are arranged in order from the top of the third stream as "+", "+" and "−"; and the signs are arranged in order from the top of the fourth stream as "−", "+", "+" and "+". In such signs, too, the orthogonal relationship holds in the combination of signs of predetermined components.

FIG. 3B illustrates a case where data is assigned to one stream alone. For clarity, "L-STF" to "HT-SIG" contained in a packet format are omitted here. That is, a structure from "HT-STF" onward is shown here. Since "HT-LTFs" are used when the second radio apparatus 10b derives an H matrix, "HT-LTFs" are also assigned to streams where no data is assigned in FIG. 3B. "HT-LTFs" are assigned to the first stream of FIG. 3B, and there is provided a blank period subsequent to the "HT-LTF" in the first stream. At the same time, in this blank period in the first stream there are assigned HT-LTFs in the second to the fourth stream. In the first stream, Data is assigned subsequent to HT-LTFs assigned to the second to the fourth stream. With this arrangement, the number of streams to which "HT-STFs" are assigned is equal to the number of streams to which data signals are assigned. Hence, the noise contained in a gain set by "HT-STF" in a receiving apparatus becomes smaller, so that the deterioration of receiving characteristics in data signals can be prevented.

Before describing a structure of the radio apparatus 10, an outline of how to derive a weight vector according to an exemplary embodiment of the present invention will be described. Here, the number of antennas 12 is denoted by $N_T$, the number of antennas 14 by $N_R$, the FFT size by Q and the maximum delay time in units of sample by Td. Further, an H matrix in the frequency domain at delay time t is denoted by $H_T(t)$ and an H matrix in the frequency domain at a frequency f is denoted by $H_F(f)$. That is, $H_T(t)$ and $H_F(f)$ form a Fourier transform pair. Note that $H_T(t)$ and $H_F(f)$ are defined by a dimension of $N_R \times N_T$. Further, a transmission weight matrix at the frequency f is denoted by W(f).

As an autocorrelation matrix function, a receiving autocorrelation matrix function of $N_R \times N_R$ is defined by the following Equation (1).

$$R_{RX}(\tau) = \frac{1}{\sqrt{Q}} \sum_{t=0}^{Q-1} H_T(t) H_T^H(t+\tau) = \frac{1}{\sqrt{Q}} \sum_{t=0}^{Td} H_T(t) H_T^H(t+\tau) \quad (1)$$

A receiving autocorrelation matrix $R_{RX}(\tau)$ and $H_F(f)H_F^H(f)$ are related to each other as a Fourier transform pair expressed by the following Equation (2).

$$R_{RX}(\tau) = IFFT[H_F(f)H_F^H(f)] \quad (2)$$

In $R_{RX}(\tau)$, $R_{RX}(0)$ alone is a Hermitian matrix (nonnegative value), and the sum $tr[R_{RX}(0)]$ of its diagonal elements represents the total energy of channels between transmit and receive antennas. Here, for simplicity, assume that rank$[R_{RX}(0)]=N_R$ and $R_{RX}(0)$ can be eigenvalue-decomposed as shown in the following Equation (3).

$$R_{RX}(0) = V_{RX} \Lambda_{RX} V_{RX}^H \quad (3)$$

where $\Lambda_{RX}$ is an $N_R$-dimensional diagonal matrix having eigenvalues as diagonal elements and $V_{RX}$ is an $N_R$-dimensional unitary matrix. $N_R$ corresponds to the number of the antennas 14. $V_{RX}^H$ is said to be a steering matrix for the frequency average of $H_F(f)H_F^H(f)$. Since the steering matrix does not depend on frequency, it is frequency-flat. $V_{RX}$ is computed, as a matrix common to all subcarriers, by Equation (3). In Equation (3), $V_{RX}$ is expressed, in the time-domain representation, as a matrix to constitute a receiving autocorrelation matrix $R_{RX}(0)$ at t=0. This is equal to the result obtained when $H_F(f)H_F^H(f)$ in the frequency domain representation is summed up over all of the subcarriers. That is, the result is expressed by the following Equation (4).

$$R_{RX}(0) = \frac{1}{\sqrt{Q}} \sum_{f=0}^{Q-1} H_F(f) H_F^H(f) \quad (4)$$

Suppose that $V_{RX}^H$ is a receiving weight matrix. Then $H_F^H V_{RX}$ will become a transmission weight matrix if the channel in question has no frequency characteristics. If the transmission weight matrix is now $H_F^H(f)V_{RX}$ by extending $H_F^H(f) V_{RX}$ to the frequency, it should be considered that $H_F^H(f)V_{RX}$ is close to an actual transmission unitary matrix. Further, each weight vector is orthogonalized using Gram-Schmidt orthonormalization (hereinafter referred to as "GS method").

As described above, a virtual receiving filter $V_{RX}^H$ is considered. By applying the GS method to each column vector of $V_{RX}$ in $H_F^H(f)V_{RX}$, the orthonormalized matrix is derived as a transmission weight $W_1(f)$ $$W_1(f) = gs[H_F^H(f)V_{RX}] \quad (5)$$

Here, to ensure the continuity of the weight vector in the frequency domain, the orthonormalization is performed in sequence from the first column vector. Since the first column vector in each frequency is subjected to the normalization only, the continuity holds in the frequency domain. As a result, the continuity tends to be retained from the second column vector onward as well.

A description is now given of an orthonormalization processing. The "continuity" in the frequency domain corresponds to how small an impulse delay spread in the time domain is wherein the impulse delay spread in the time domain is obtained after IFFT is performed on the transmission weight matrix $W_1(f)$. To facilitate the explanation, the term $H_F^H(f)$ only will be first discussed assuming for convenience that the term $V_{RX}$ is dropped from $H_F^H(f)V_{RX}$. $H_F^H(f)$ simply corresponds to the Hermitian transpose of a channel $H_F(f)$. Accordingly, if a multipath wave exists in the guard interval length of 16 samples, the impulse delay where the IFFT has been subjected to $H_F^H(f)$ will also cover 16 samples. Next, a description is given of $H_F^H(f)V_{RX}$ where $H_F^H(f)$ is multiplied by $V_{RX}$ from the right. $V_{RX}$ is merely a coefficient matrix that does not depend on the frequency and is frequency-flat, so that the impulse delay of $H_F^H(f)V_{RX}$ is also of 16 samples. That is, the matrix $H_F^H(f)V_{RX}$ or each column vector in the matrix $H_F^H(f)V_{RX}$ prior to performing the orthonormalization thereon is continuous in the frequency domain.

Figure 4:
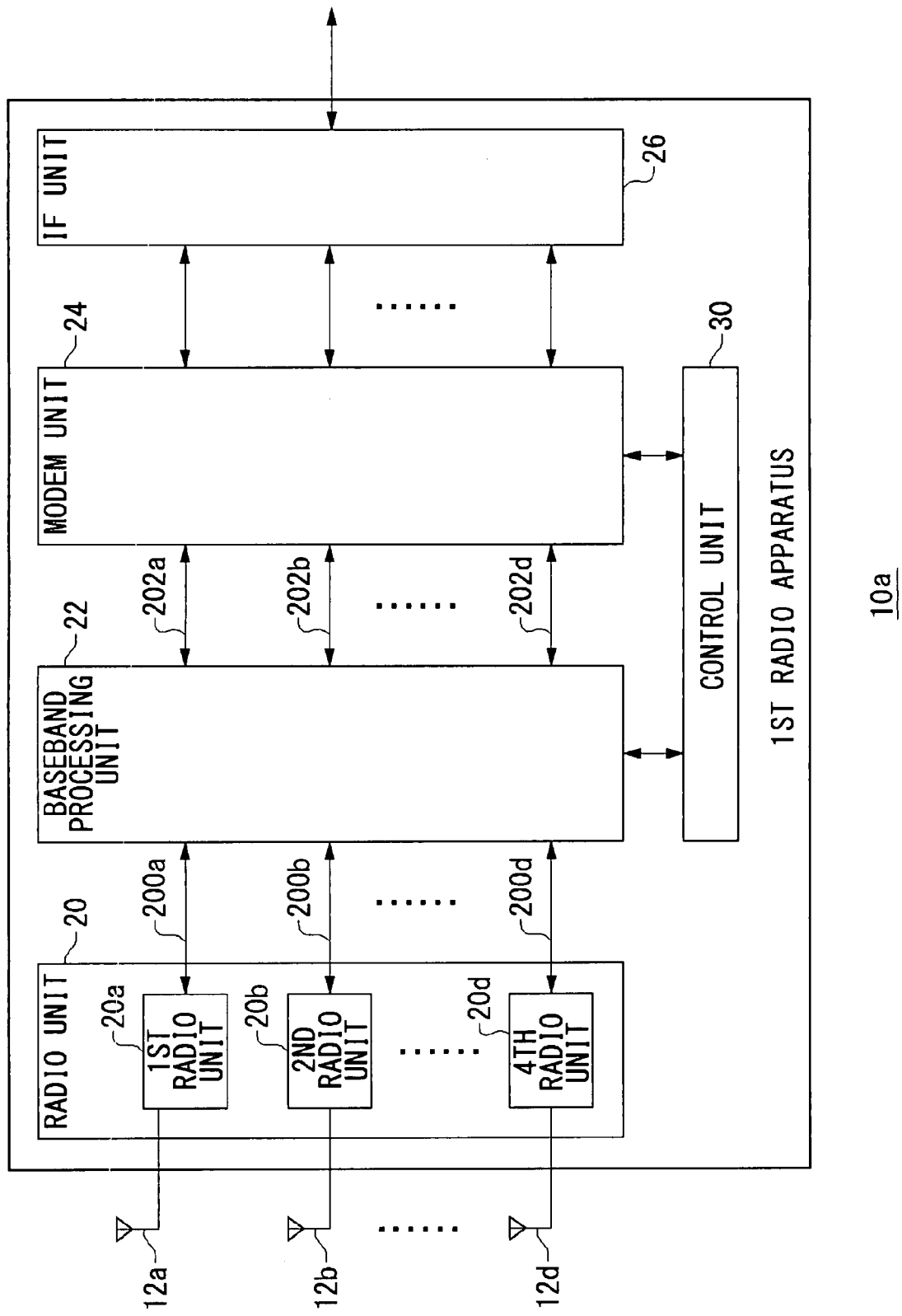
FIG. 4 illustrates a structure of a first radio apparatus shown in FIG. 2.

The first column vector of the matrix $H_F^H(f)V_{RX}$ is normalized on a subcarrier-by-subcarrier basis. The normalization corresponds to that the amplitude is corrected so that the Euclidean norm or its squared value becomes "1" on a subcarrier-by-subcarrier basis. Since the variation in the amplitude of the original vector is also continuous in the frequency direction, the variation in the amplitude as a result of the normalization is also continuous. Accordingly, the vector obtained after the normalization is said to vary also continuously. However, since the amplitude variation is newly added, the major part of impulse delay is contained within 16 samples but there are cases where the delay spreads beyond 16 samples. $w_{1,i}(f)$ (i=2, 3, ...) after the second weight vector retains its continuity and is orthogonal to $w_{1,j}(f)$ (j<i), and it is derived as a vector most parallel to the original vector for each subcarrier. Since all of them are derived from the frequency continuous components, the frequency continuity is ensured even if they are derived subcarrier by subcarrier FIG. 4 illustrates a structure of a first radio apparatus 10a. The first radio apparatus 10a includes a first radio unit 20a, a second radio unit 20b, ... and a fourth radio unit 20d, which are generically referred to as "radio unit 20", a baseband processing unit 22, a modem unit 24, an IF unit 26 and a control unit 30. Signals involved include a first time-domain signal 200a, a second time-domain signal 200b, ... and a fourth time-domain signal 200d, which are generically referred to as "time-domain signal 200", and a first frequency-domain signal 202a, a second frequency-domain signal 202b and a fourth frequency-domain signal 202d, which are generically referred to as "frequency-domain signal 202". The second radio apparatus 10b has a structure similar to that of the first radio apparatus 10a.

As a receiving operation, the radio unit 20 carries out frequency conversion of radiofrequency signal received by the antennas 12 so as to derive baseband signals. The radio unit 20 outputs the baseband signals to the baseband processing unit 22 as the time-domain signals 200. The baseband signal, which is composed of in-phase components and quadrature components, shall generally be transmitted by two signal lines. For the clarity of figure, the baseband signal is presented here by a single signal line only. An AGC (Automatic Gain Control) unit and an A-D conversion unit are also included. The AGC unit sets gain based on "L-STF" and "HT-STF".

As a transmission operation, the radio unit 20 carries out frequency conversion of baseband signals from the baseband processing unit 22 so as to derive radiofrequency signals. Here, the baseband signal from the baseband processing unit 22 is also indicated as the time-domain signal 200. The radio unit 20 outputs the radiofrequency signals to the antennas 12. That is, the radio unit 20 transmits radio-frequency packet signals from the antennas 12. A PA (Power Amplifier) and a D-A conversion unit are also included. It is assumed herein that the time-domain signal 200 is a multicarrier signal converted to the time domain and is a digital signal.

As a receiving operation, the baseband processing unit 22 converts a plurality of time-domain signals 200 respectively into the frequency domain and performs adaptive array signal processing on the thus converted frequency-domain signals. Then the baseband processing unit 22 outputs the result of adaptive array signal processing as the frequency-domain signals 202. One frequency-domain signal 202 corresponds to data contained respectively in a plurality of streams transmitted. As a transmission operation, the baseband processing unit 22 inputs, from the modem unit 24, the frequency-domain signals 202 serving as signals in the frequency domain, and performs distribution processing by the weight vectors. That is, eigenbeams in a MIMO eigenmode transmission are formed.

The baseband processing unit 22 converts signals in the frequency domain into those in the time domain and outputs them as the time-domain signal 200. It is assumed that the number of antennas 12 to be used in the transmission processing is specified by the control unit 30. It is assumed herein that the frequency-domain signal 202, which is a signal in the frequency domain, contains a plurality of subcarrier components as shown in FIG. 1. For the clarity of figure, the frequency-domain signal is arranged in the order of the subcarrier numbers, and forms serial signals.

Figure 5:
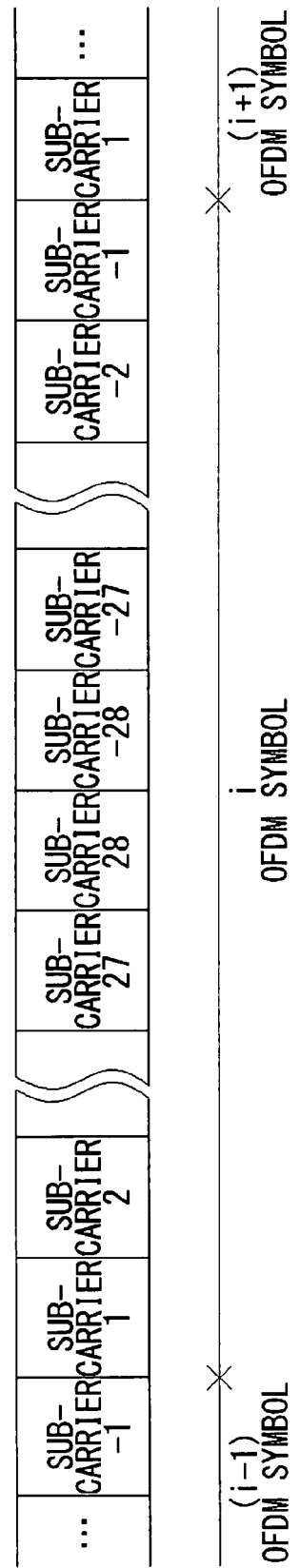
FIG. 5 illustrates a structure of a frequency-domain signal shown in FIG. 4.

FIG. 5 illustrates a structure of a frequency-domain signal. Assume herein that a combination of subcarrier numbers "−28" to "28" shown in FIG. 1 constitutes an "OFDM symbol". An "i"th OFDM symbol is such that subcarriers components are arranged in the order of subcarrier numbers "1" to "28" and subcarrier numbers "−28" to "−1". Assume also that an "(i−1)"th OFDM symbol is placed before the "i"th OFDM symbol, and an "(i+1)"th OFDM symbol is placed after the "i"th OFDM symbol.

Refer back to FIG. 4. As a receiving processing, the modem unit 24 demodulates and deinterleaves the frequency-domain signal 202 outputted from the baseband processing unit 22. The demodulation is carried out per subcarrier. When the decoding is carried out, a smoothing processing is also performed among subcarriers. The modem unit 24 outputs the demodulated signal to the IF unit 26. As a transmission processing, the modem unit 24 carries out interleaving and modulation. The modem unit 24 outputs the modulated signal to the baseband processing unit 22 as a frequency-domain signal 202. When the transmission processing is carried out, the modulation scheme is specified by the control unit 30. Note that the processings in the baseband processing unit 22 and the modem unit 24 may be performed in the time domain. In such a case, the channel characteristics are derived in the time domain.

As a receiving processing, the IF unit 26 combines signals outputted from a plurality of modem units 24 and then forms one data stream. The IF unit 26 decodes the one data stream. The IF unit 26 outputs the decoded data stream. As a transmission processing, the IF unit 26 inputs one data stream, then codes it and, thereafter, separates the coded data stream. Then the IF unit 26 outputs the thus separated data to a plurality of modem units 24. When the transmission processing is carried out, the coding rate is specified by the control unit 30. Here, an example of the coding is convolutional coding, whereas an example of decoding is Viterbi decoding. The control unit 30 controls the timing and the like of the first radio apparatus 10a.

The first radio apparatus 10a and the second radio apparatus 10b further includes additional structural components to realize the following functions. The first radio apparatus 10a transmits the multicarrier signals composed of a plurality of streams as shown in FIG. 3A or FIG. 3B. At an early stage, the baseband processing unit 122 in the first radio apparatus 10a transmits the multicarrier signals without forming the eigenbeams. The antenna 14 of the second radio apparatus 10b receives the multicarrier signals from the first radio apparatus 10a. The baseband processing unit 22 in the second radio apparatus 10b performs adaptive array signal processing and, at the same time, derives H matrices.

As described above, an H matrix has elements the number of which is determined by the number of a plurality of antennas 12 and the number of a plurality of antennas 14, and the values of which correspond to channel characteristics between a plurality of antennas 12 and a plurality of antennas 14, respectively. Since the H matrix is derived for each subcarrier, the H matrix corresponds to $H_F(f)$. The H matrix is derived in a field of "HT-LTF" in the packet signal as shown in FIG. 3A or 3B. The second radio apparatus 10b stores the H matrix in a field of "Data" in a packet signal and then transmits said packet to the first radio apparatus 10a from the modem unit 24, the baseband processing unit 22, the radio unit 20 and the antenna 14.

The IF unit 26 in the first radio apparatus 10a acquires the H matrix sent from the second radio apparatus 10b, from the antenna 12 via the modem unit 24 per subcarrier. The IF unit 26 outputs the acquired H matrix to the baseband processing unit 22 in the first radio apparatus 10a. The baseband processing unit 22 derives an autocorrelation matrix common to H matrices acquired per subcarrier. Here, the common autocorrelation matrix is an autocorrelation matrix which does not depend on subcarriers, and it corresponds to an autocorrelation matrix derived from Equation (4). Note that the baseband processing unit 22 may derive the common autocorrelation matrix by computing a frequency average $E[H_F(f)H_F^H(f)]$.

The baseband processing unit 22 derives the steering matrix $V_{RX}$ by eigenvalue-decomposing the derived common autocorrelation matrix as in Equation (3). As described earlier, the number of a plurality of antennas 14 is set equal to the dimension of the autocorrelation matrix and the steering matrix derived in the baseband processing unit 22. Then the baseband processing unit 22 derives a matrix where the derived steering matrix is operated on an H matrix per subcarrier. Here, the Hermitian transpose of an H matrix per subcarrier is multiplied by the steering matrix so as to derive $H_F^H(f)V_{RX}$. Further, as in Equation (5) the baseband processing unit 22 performs the orthonormalization, for example, Gram-Schmidt orthonormalization on the matrix $H_F^H(f)V_{RX}$, respectively, so as to derive, per subcarrier, weight vectors for a plurality of streams, respectively. The weight vectors correspond respectively to the column vectors of the above-described transmission weight matrix. While using the derived weight vectors, the baseband processing unit 22 transmits the multicarrier signals composed of a plurality of streams from a plurality of antennas 12. That is, while forming the eigenbeams, the baseband processing unit 22 transmits the multicarrier signals.

In terms of hardware, this structure described as above can be realized by a CPU, a memory and other LSIs of an arbitrary computer. In terms of software, it can be realized by memory-loaded programs which have communication functions and the like, but drawn and described herein are function blocks that are realized in cooperation with those. Hence, it is understood by those skilled in the art that these function blocks can be realized in a variety of forms such as by hardware only, software only or the combination thereof.

Figure 6:
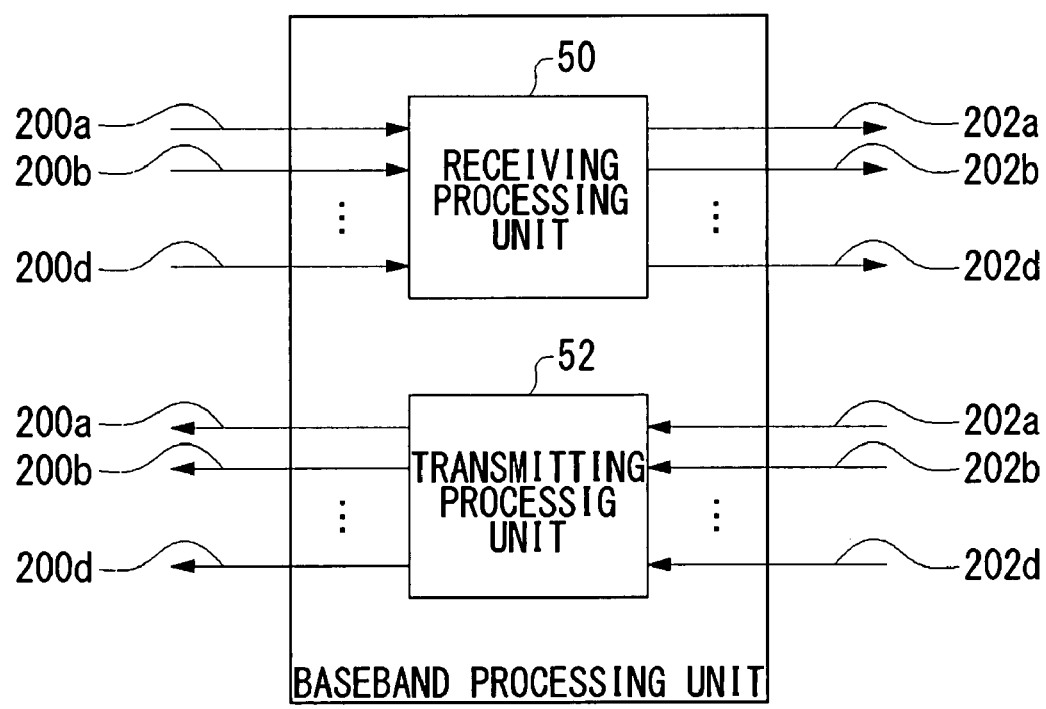
FIG. 6 illustrates a structure of a baseband processing unit shown in FIG. 4.

FIG. 6 illustrates a structure of a baseband processing unit 22. The baseband processing unit 22 includes a processing unit for use with receiving 50 and a processing unit for use with transmission 52. The receiving processing unit 50 executes a part, corresponding to a receiving operation, of operations by the baseband processing unit 22. That is, the receiving processing unit 50 performs adaptive array signal processing on time-domain signals 200 and therefore derives receiving weight vectors. The receiving processing unit 50 outputs the result of array synthesis as the frequency-domain signal 202. Further, the receiving processing unit 50, particularly the receiving processing unit 50 in the second radio apparatus 10b, derives an H matrix on a subcarrier-by-subcarrier basis.

The transmitting processing unit 52 executes a part, corresponding to a transmission operation, of operations by the baseband processing unit 22. As described above, in particular, the transmitting processing unit 52 in the first radio apparatus 10a derives, from the received H matrix, a weight vector for forming an eigenbeam and executes MIMO eigenmode transmission by the thus derived weight vector. In order to perform the above-described processing, the transmitting processing unit 52 derives the common autocorrelation matrix and also performs eigenvalue decomposition and orthonormalization. The transmitting processing unit 52 outputs finally the time-domain signals 200.

Figure 7:
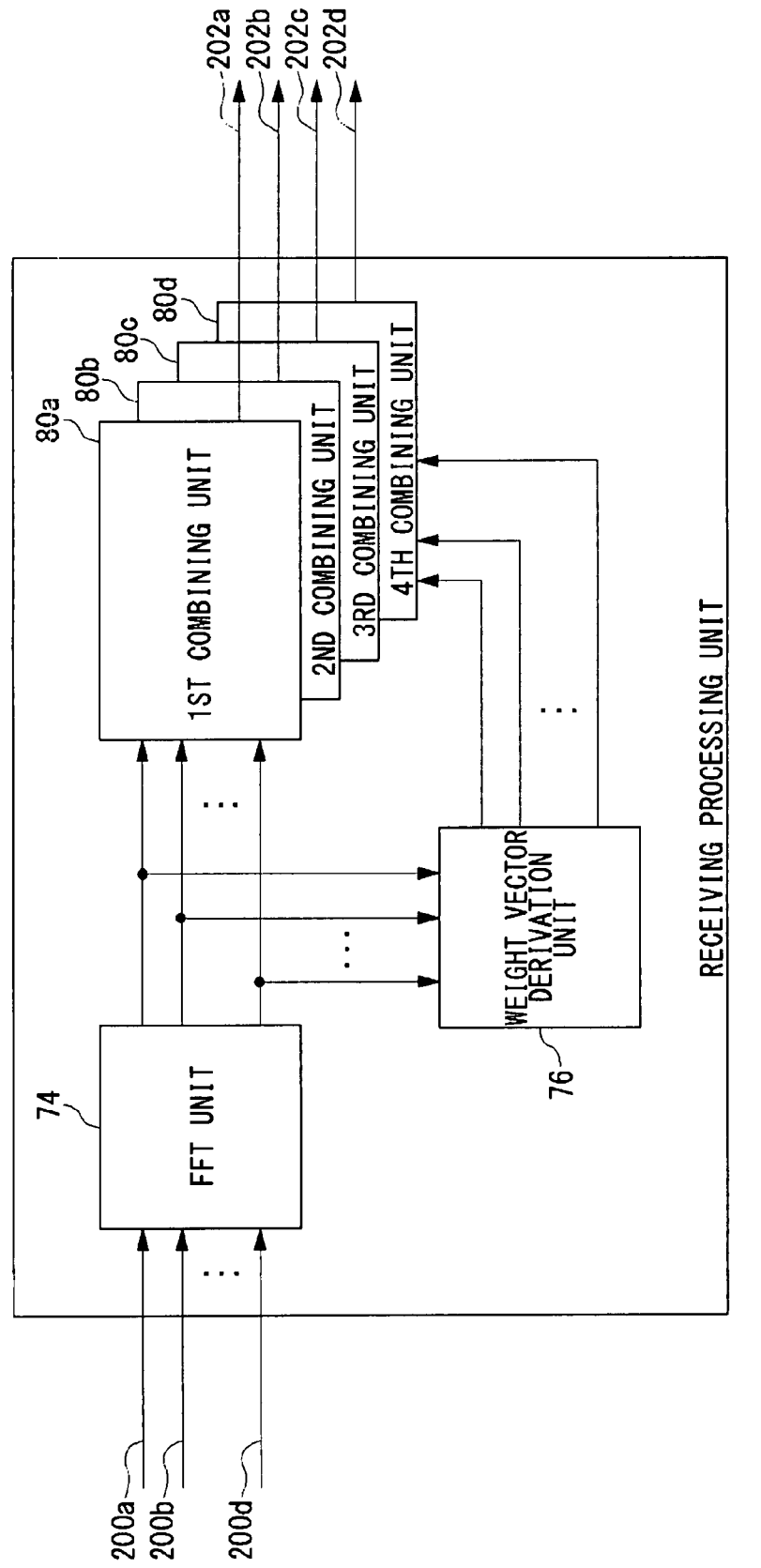
FIG. 7 illustrates a structure of a receiving processing unit shown in FIG. 6.

FIG. 7 illustrates a structure of the receiving processing unit 50. The receiving processing unit 50 includes an FFT unit 74, a weight vector derivation unit 76, and a first combining unit 80a, a second combining unit 80b, a third combining unit 80c and a fourth combining unit 80d, which are generically referred to as "combining unit 80".

The FFT unit 74 performs FFT on the time-domain signal 200 so as to convert the time-domain signal 200 into a frequency-domain value. It is assumed here that the frequency-domain value is structured as shown in FIG. 5. That is, a frequency-domain value for one time-domain signal 200 is outputted via one signal line.

The weight vector derivation unit 76 derives a weight vector from a frequency-domain value, on a subcarrier-by-subcarrier basis. The weight vector is so derived as to correspond to each of a plurality of streams, and a weight vector for one stream in the second radio apparatus 10b has elements corresponding to the number of antennas 14, for each subcarrier. Note that a weight vector in the first radio apparatus 10a has elements corresponding to the number of antennas 12, for each subcarrier. To derive the weight vector corresponding to each of a plurality of streams, an adaptive algorithm may be used or channel characteristics may be used. Since any known technique is preferably employed for such processings, the explanation thereof is omitted here. When deriving the weight vector, the weight vector derivation unit 76 executes an operation of the first component minus (−) the second component plus (+) the third component minus (−) the fourth component, first component+second component or the like, as described earlier.

The weight vector derivation unit 76 in the second radio apparatus 10b derives an H matrix per subcarrier. The derived H matrix is expressed as follows.

$$H = \begin{bmatrix} h_{11} & h_{21} & h_{31} & h_{41} \\ h_{12} & h_{22} & h_{32} & h_{42} \\ h_{13} & h_{23} & h_{33} & h_{43} \\ h_{14} & h_{24} & h_{34} & h_{44} \end{bmatrix} \quad (6)$$

The weight vector derivation unit 76 outputs the derived H matrix to the IF unit 26 (not shown in FIG. 7).

The combining unit 80 combines the frequency-domain value converted by the FFT unit 74 with the weight vector outputted from the weight vector derivation unit 76. For example, as the weight vector to which a multiplication is to be executed, a weight which corresponds to both one subcarrier and the first stream is selected from among the weight vectors from the weight vector derivation unit 76. The selected weight has a value corresponding to each antenna 12.

As another weight vector to which a multiplication is to be executed, a value corresponding to one subcarrier is selected from among the frequency-domain values converted by the FFT unit 74. Note that The selected value contains a value corresponding to each antenna 12. Note that both the selected weight and the selected value belong to the same subcarrier. While being associated respectively with the antennas 12, the selected weight and the selected value are each multiplied together and the multiplication results are summed up. As a result, a value corresponding to one subcarrier in the first stream is derived. In the first combining unit 80a, the above-described processing is performed on the other subcarriers so as to derive data corresponding to the first stream. The similar processing is carried out to derive data corresponding respectively to the second to fourth streams. The derived first to fourth streams are outputted as the first frequency-domain signal 202a to the fourth frequency-domain signal 202d, respectively. Though a description has been given concerning the first radio apparatus 10a, the antennas 12 are replaced by the antennas 14 in the case when the processing in the second radio apparatus 10b is to be explained.

Figure 8:
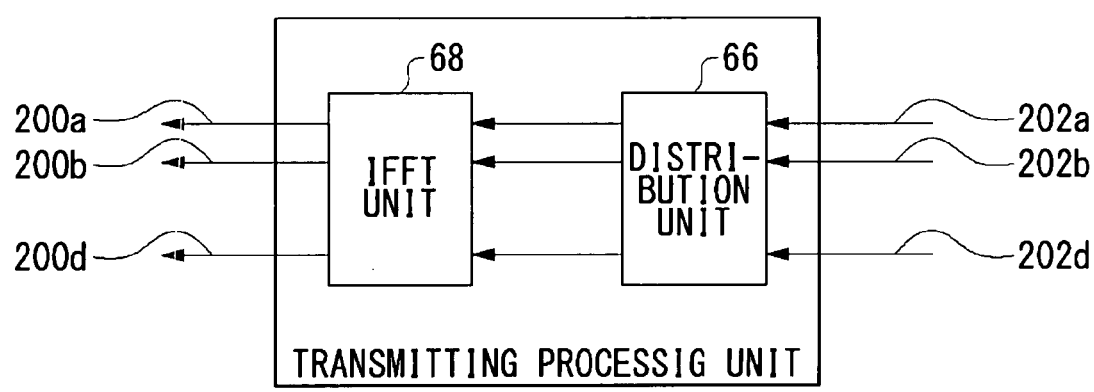
FIG. 8 illustrates a structure of a transmitting processing unit shown in FIG. 6.

FIG. 8 illustrates a structure of the transmitting processing unit 52. The transmitting processing unit 52 includes a distribution unit 66 and an IFFT unit 68. The distribution unit 66 receives the H matrix from the not-shown IF unit 26 and derives a common autocorrelation matrix and performs eigenvalue decomposition and applies the GS-method operation thereto. As described above, the derivation of the common autocorrelation matrix and the eigenvalue decomposition thereof correspond respectively to Equation (4) and Equation (3). The GS-method operation corresponds to Equation (5) but it is assumed here that each column vector of $H_F^H(f)V_{RX}$ is expressed by $\{v0, v1, v2, vN_R\}$. In the GS method, the column vector v0 is first selected and then the selected column vector is divided by its norm. That is, w0= (v0, v0)$^{-1}$v0 is derived. Further, the following operation is performed.

$$w'_1 = v_1(w_0, v_1)w_0, \quad w_1 = (w'_1, w'_1)^{-1}w'_1 \quad (7)$$
$$w'_2 = v_2 - (w_0, v_2)w_0 - (w_1, v_2)w_1, \quad w_2 = (w'_2, w'_2)^{-1}w'_2$$
$$M$$
$$w'_n = v_n - \sum_{i=1}^{n-1}(w_i, v_n)w_i, \quad w_n = (w'_n, w'_n)^{-1}w'_n$$

The matrix formed by the vectors derived in this manner corresponds to the transmission weight matrix $W_1(f)$. Further, while associating the weight vectors with streams, the distribution unit 66 weights a stream with a weight vector for each subcarrier. Such weighting corresponds to the formation of eigenbeams.

The IFFT unit 68 performs IFFT on the frequency-domain signals outputted from the distribution unit 66 and then outputs time-domain signals. As a result thereof, the IFFT unit 68 outputs the time-domain signals the number of which is equal to the number of results corresponding to the number of streams times the number of antennas 12. Further, the IFFT unit 68 combines time-domain signals of a plurality of streams which are to be assigned to an antenna 12 and then outputs the result of the combining as a time-domain signal 200. For example, the time-domain signal of the first stream through the time-domain signal of the fourth stream which are to be assigned to the first antenna 12a are combined together.

Figure 9:
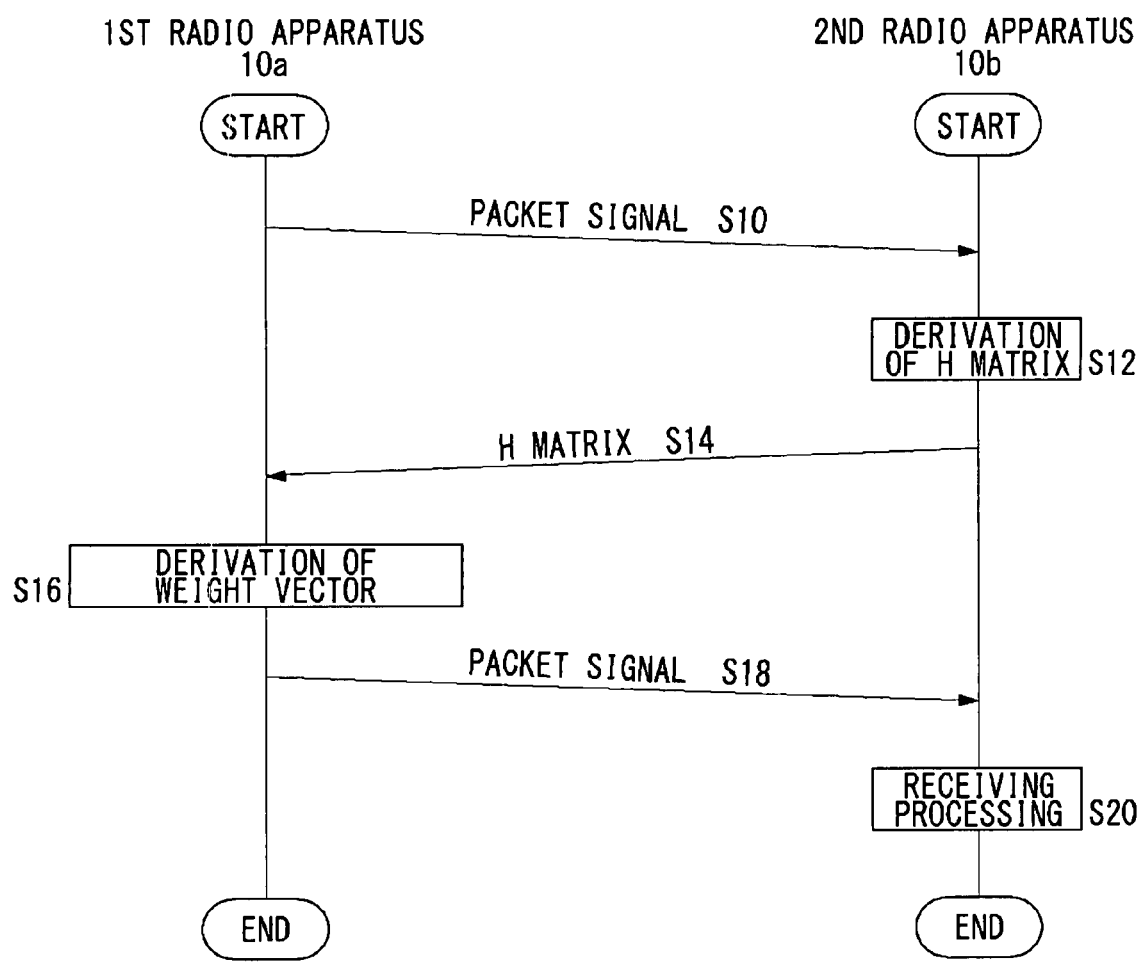
FIG. 9 is a sequence diagram showing a data communication procedure in a communication system of FIG. 2.

An operation of the communication system 100 structured as above is described. FIG. 9 is a sequence diagram showing a data communication procedure in the communication system 100. The first radio apparatus 10a transmits to the second radio apparatus 10b a packet signal without: forming the eigenbeams (S10). The second radio apparatus 10b derives an H matrix from HT-LTF contained in the received packet signal, per subcarrier (S12). The second radio apparatus 10b transmits the derived H matrix to the first radio apparatus 10a (S14). The first radio apparatus 10a derives a weight vector from the received H matrix (S16). Here, the weight vector is derived in order to perform the MIMO eigenmode transmission. While forming the eigenbeams, the first radio apparatus 10a transmits the packet signal to the second radio apparatus 10b (S18). The second radio apparatus 10b has the packet signal undergo a receiving processing (S20). The receiving processing includes a smoothing processing.

Hereinafter, modifications to the present embodiments will be described. An outline of processing in a modification is first described.

As an autocorrelation matrix function, a transmission autocorrelation matrix function of $N_T \times N_T$ is defined by the following Equation (8).

$$R_{TX}(\tau) = \frac{1}{\sqrt{Q}}\sum_{t=0}^{Q-1} H_T^H(t)H_T(t+\tau) = \frac{1}{\sqrt{Q}}\sum_{t=0}^{T_d} H_T^H(t)H_T(t+\tau) \quad (8)$$

The transmission autocorrelation matrix function $R_{TX}(\tau)$ and $H_F^H(f)H_F(f)$ are related to each other as a Fourier transform pair expressed by the following Equation (9).

$$R_{TX}(\tau) = IFFT[H_F^H(f)H_F(f)] \quad (9)$$

$R_{TX}(0)$ is a Hermitian matrix having nonnegative values and tr[$R_{RX}(0)$]=tr[$R_{TX}(0)$]. Here, for simplicity, assume that rank[$R_{TX}(0)$]=$N_T$ and $R_{TX}(0)$ can be eigenvalue decomposed as shown in the following Equation (10).

$$R_{RX}(0) = U_{TX}\Lambda_{TX}U_{TX}^H \quad (10)$$

where $\Lambda_{TX}$ is an $N_T$-dimensional diagonal matrix which has eigenvalues as the diagonal elements and $U_{TX}$ is an $N_R$-dimensional unitary matrix. Note that, similar to the exemplary embodiments, $R_{TX}(0)$ may be derived as follows.

$$R_{RX}(0) = \frac{1}{\sqrt{Q}}\sum_{t=0}^{Q-1} H_F(t)H_F^H(f) \quad (11)$$

Assume here that $U_{TX}$ is a transmission weight matrix. If it is a channel which has no frequency characteristics, $U_{TX}^H H_F$ will be a receiving weight matrix. If the receiving weight matrix is set to $U_{TX}^H H_F(f)$ by extension, it is considered that it will be close to an actual receiving unitary matrix. Further, it is considered that it will be closer to a transmission unitary matrix by using $H_F^H(f)H_F(f)U_{TX}$ from this receiving unitary matrix.

Assume here that a filter $U_{TX}$ is used in the transmission side and a transmission weight $W_2(f)$ is obtained when the GS method is applied to each column vector of $H_F^H(f)H_F^H(f)U_{TX}$ in each frequency.

$$W_2(f) = gs[H_F^H(f)H_F(f)U_{TX}] \quad (12)$$

Comparing $W_1(f)$ with $W_2(f)$, $W_2(f)$ is derived from a matrix where the number of multiplications is greater than that in $W_1(f)$ by one term, namely the H matrix $H_F(f)$. Thus, thanks to this power method effect, it is likely that a weight closer to the eigenvector is obtained.

Hereinafter, for convenience, the embodiment is called a first proposed method, whereas a modification is called a second proposed method. By employing the first and the second proposed method, the computation amount is reduced to about ⅓ to about ⅕ as compared with when the eigenvector is obtained for each frequency.

A structure of such a modification as described above, namely the structure of the communication system 100 and the radio apparatus 10 according to the second proposed method is of a type similar to that of the communication system 100 and the radio apparatus 10 according to the embodiment. The dimension of a common autocorrelation matrix and a steering matrix derived by the baseband processing unit 22 in the first radio apparatus 10a corresponds to the number of a plurality of antenna 12. The baseband processing unit 22 performs Gram-Schmidt orthonormalizaion on each term of the matrix $H_F^H(f)H_F(f)U_{TX}$ which is a multiplication result of the Hermitian transpose of a channel matrix per subcarrier, a channel matrix per subcarrier and a steering matrix.

A description will now be given of frequency responses in the first proposed method and the second proposed method. The maximum number of streams is denoted by K and a transmission weight matrix W(f) is expressed by $W(f)=[w_1(f), \ldots, w_K(f)]$. Then a spectral density $\lambda'_i$ of received power in an ith stream is defined by the following Equation (13).

$$\lambda'_i(f)=\|H_F(f)w_i(f)\|=w_i^H(f)H_F^H(f)H_F(f)w_{ii}(f) \quad (13)$$

Figure 10:
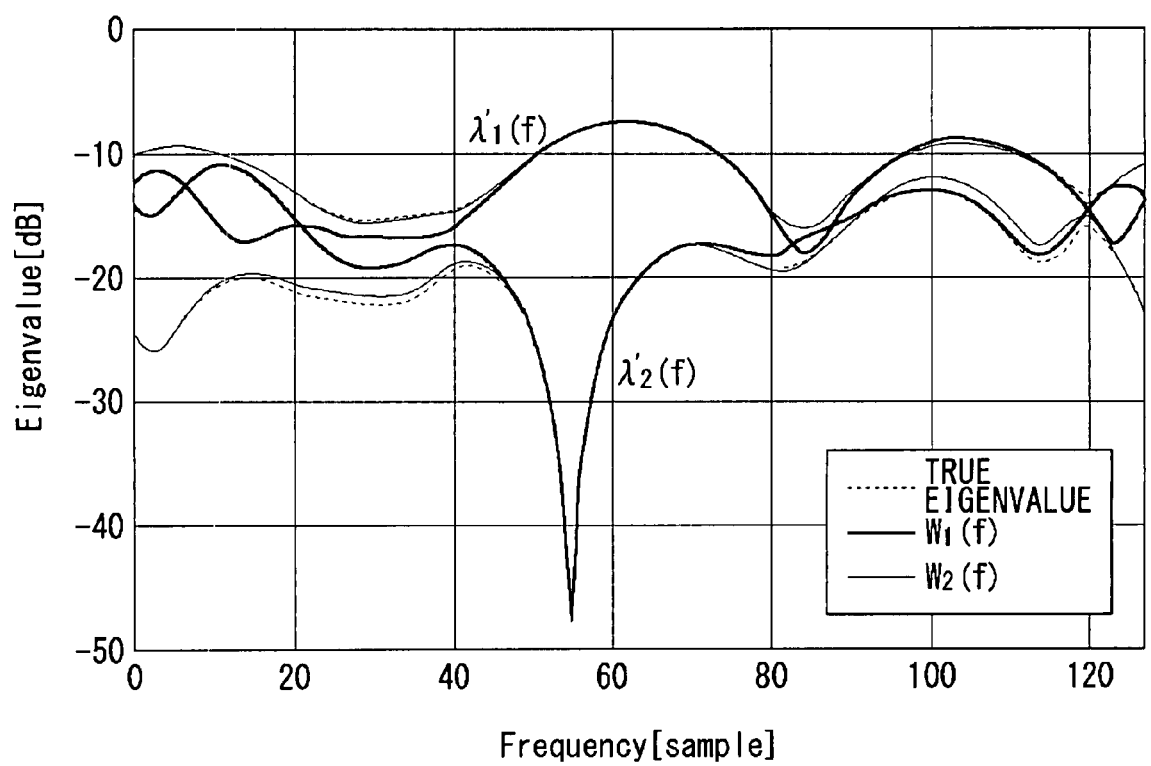
FIG. 10 shows frequency responses in a communication system of FIG. 2.

This corresponds to the original quality of a stream obtained when there is no interstream interference or the interference is ideally removed. If a transmission weight $w_i(f)$ is an eigenvector, $\lambda'_i(f)$ will be an eigenvalue $\lambda_i(f)$ FIG. 10 shows frequency responses in the communication system 100. FIG. 10 corresponds to an example of $\lambda'_i(f)$ where Q=128 and the multipath wave number is 5. Note that the multipath wave arrives within 5 samples and it is attenuated by 1[dB] for every sampling time. As shown in FIG. 10, overall, both $W_1(f)$ and $W_2(f)$ indicate values close to the true eigenvalues. In particular, when $W_2(f)$ is used, it is more likely to indicate values closer to the true eigenvalues. This is due to the above-mentioned power method effect. When $W_1(f)$ is used, there are more cases where $\lambda'_i(f)$ deviates from the true eigenvalues as compared with when $W_2(f)$ is used. Also, there are several cases where $\lambda'_1(f)$ and $\lambda'_2(f)$ are reversed. That is, it is expected that the interstream interference will be larger when $W_1(f)$ is used but it is considered that streams are formed where the quality difference among the streams is small.

Figure 11A:
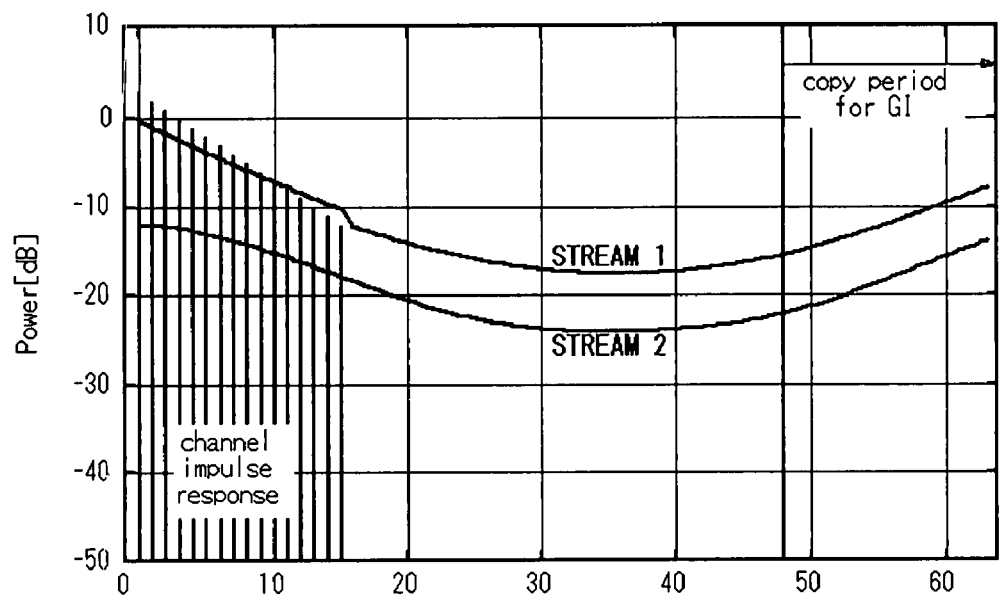
FIGS. 11A to 11F show time characteristics in a communication system of FIG. 2.
Figure 11B:
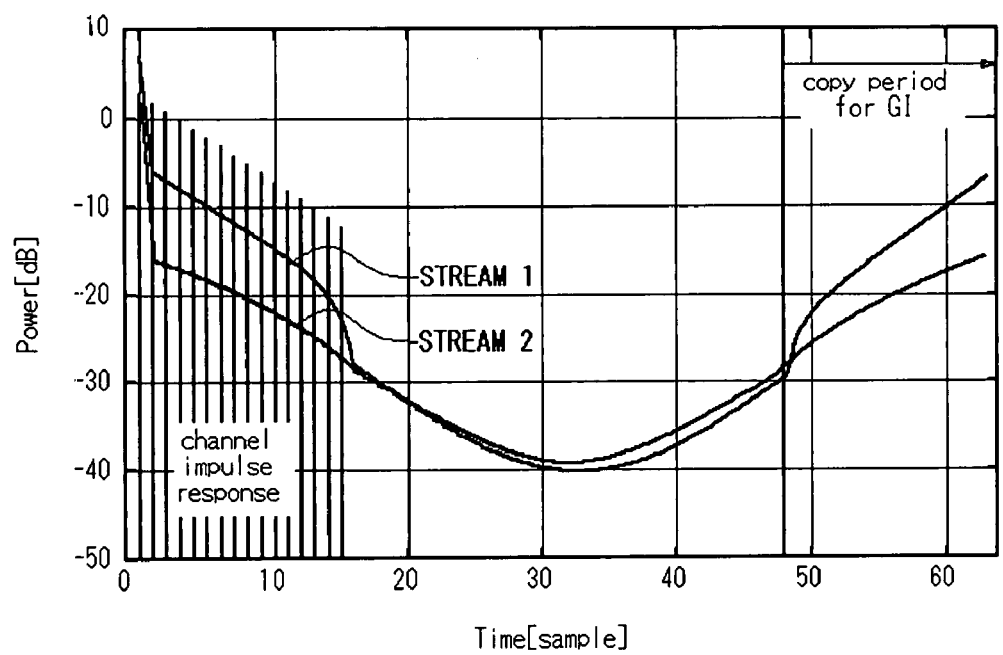
Figure 11C:
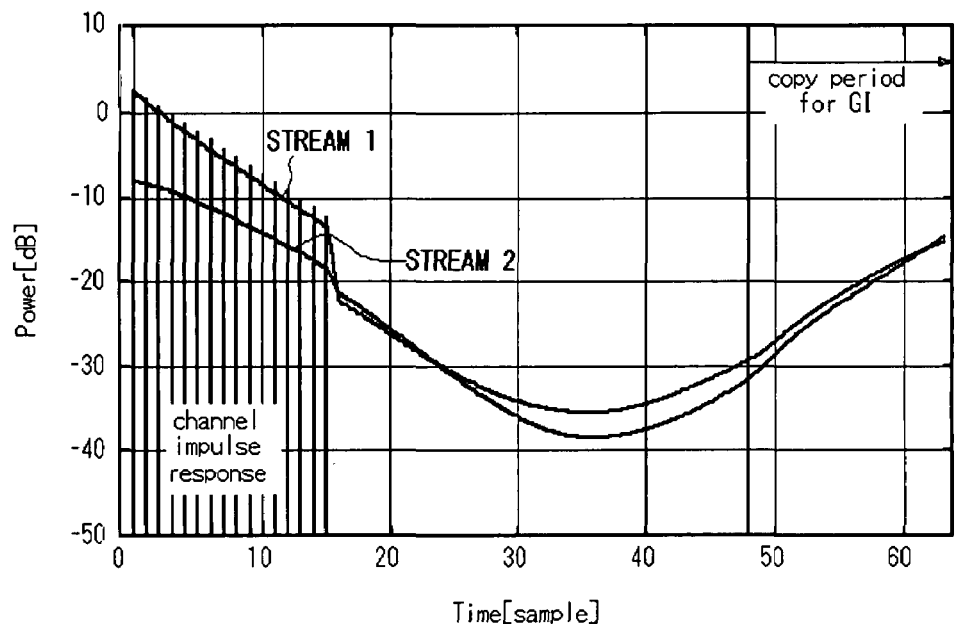
Figure 11D:
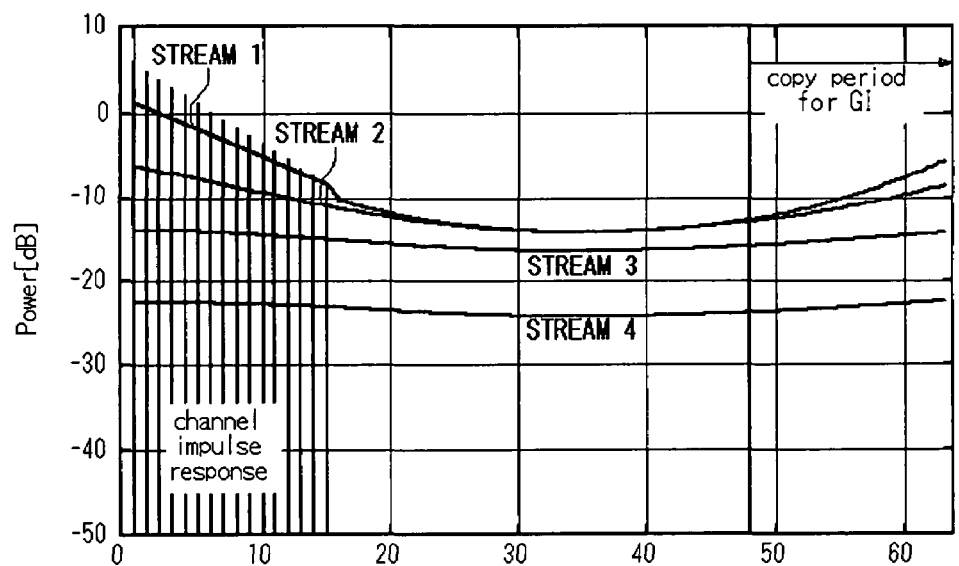
Figure 11E:
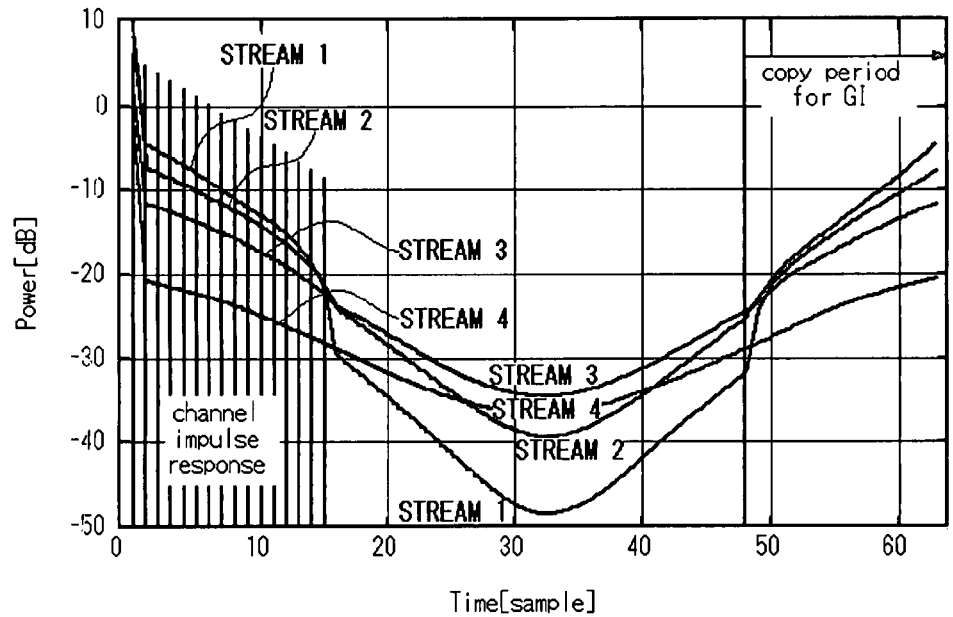
Figure 11F:
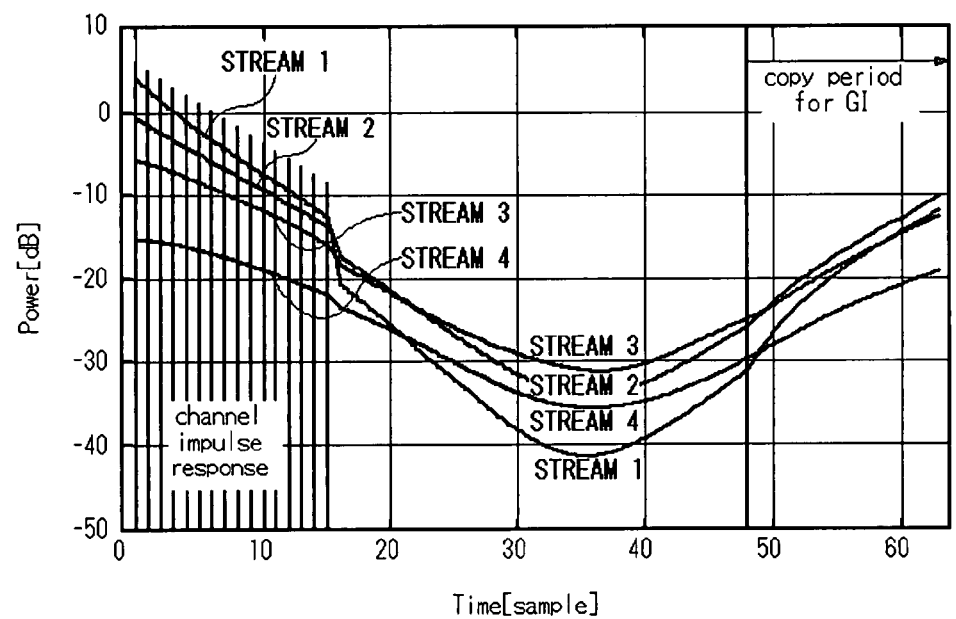

FIGS. 11A to 11F show time characteristics in the communication system 100. The impulse responses, where the $H_F(f)W(f)$ are subjected to inverse Fourier transform, are obtained respectively for the two proposed methods and additionally a third method (eigenbeams) where an eigenvector matrix is used, and then an average power at each sampling time is derived. FIGS. 11A to 11C correspond to 2×2 MIMO whereas FIG. 11D to 11F correspond to 4×4 MIMO. Also, FIGS. 11A and 11D correspond to a case where an eigenvector is used for each frequency; FIGS. 11B and 11E correspond to the first proposed method; and FIGS. 11C and 11F correspond to the second proposed method.

Here, the characteristics are the observed values of one antenna 14. It is assumed that the IEEE802.11a standard is used here, Q=64 and there are 16 multipath waves. Since the average received power of an advancing wave in a SISO (Single-Input Single-Output) is set to 0[dB], the impulse response of a channel itself is such that the average received power of an advancing wave is 3[dB] in the 2×2 MIMO and 6[dB] in the 4×4 MIMO. When the eigenvector is used, the time spectrum is of flat characteristics as a whole and the electric power is large even outside the guard interval. This is because the eigenvector is a weight that does not have continuity property in the frequency domain.

It is speculated that an estimation needs to be performed over the entire time period if these impulse responses are to be estimated in the time domain. On the other hand, when the second proposed method is used, the electric power is large within a guard interval but it is small outside the guard interval. In particular, the first proposed method operates in such a manner that the electric power is concentrated at the zeroth sample. Here, as for the first stream, let us focus attention on the sixteenth sample that first becomes outside the guard interval. For the electric power using the eigenvector, the first proposed method succeeds in reducing it by about 15[dB] in the 2×2 MIMO and about 20[dB] in the 4×4 MIMO. In this manner, if a pseudo eigenvector is used for a transmission weight as in the second proposed method, an effective channel observed at a receiving side can be said to maintain the frequency continuity and suppress the delay spread of the impulse responses. From the above, it is concluded that when a pseudo eigenvector having a certain correlation with an eigenvector is multiplied as a transmission weight, the pseudo eigenvector can be said to ensure the frequency continuity of an effective channel observed at a receiving side.

To evaluate the transmission characteristics in the proposed methods, error rate characteristics were obtained by carrying out a computer simulation. FIG. 12 shows simulation data. Here, the total number of bits assigned to each subcarrier and the total amount of transmission power are each set to a predetermined value. Under this condition, a transmission resource control is performed, by a minimum standard of error rate, according to the spectral density $\lambda'_i$ of received power. Accordingly, the number of streams and the bit allocation differ subcarrier by subcarrier. In order to cope with this, coding bits are interleaved and assigned to each stream of each subcarrier in the error correcting coding. This corresponds to spatial interleaving. In order to perform soft-input Viterbi decoding, a soft-decision value is required for each bit. Here, for simplicity, those closest to a receiving point among signal points whose bit is 1 or 0 are obtained respectively, and the square of the Euclidean distance thereof is used as a log likelihood. However, to equalize the reliability of each subcarrier and each stream, the obtained log likelihood is weighted with the reciprocal of an error power. The delay profile of arriving waves is herein set equal to the above-described time characteristics. By way of comparison, characteristics of normal SDM transmission were also obtained.

Figure 13A:
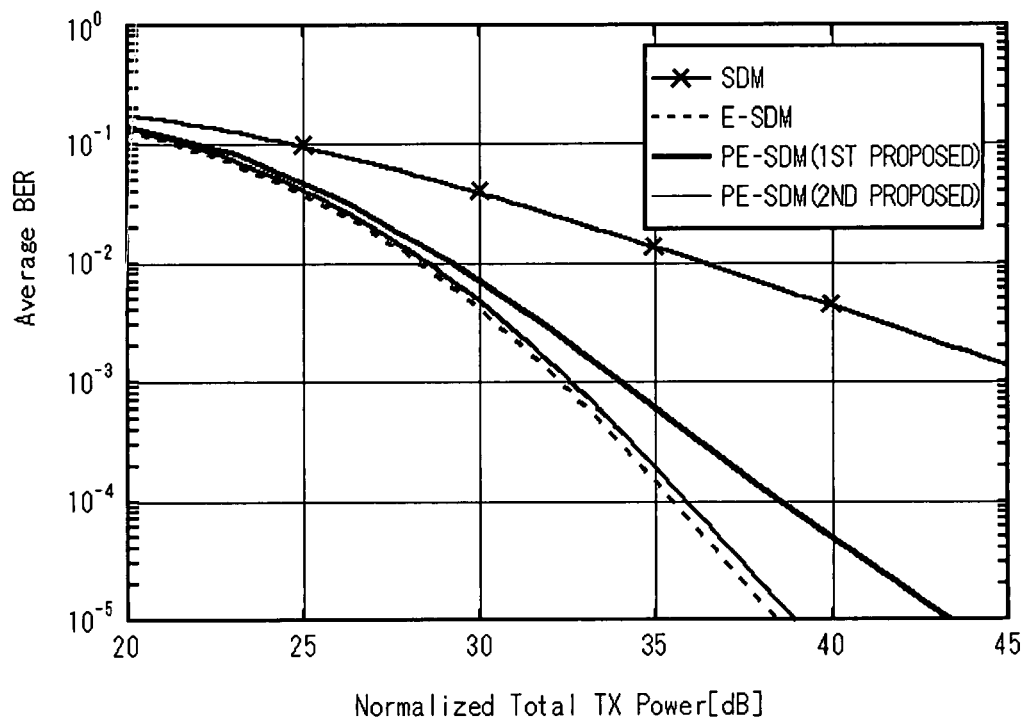
FIGS. 13A to 13D show transmission characteristics of a communication system shown in FIG. 2.
Figure 13B:
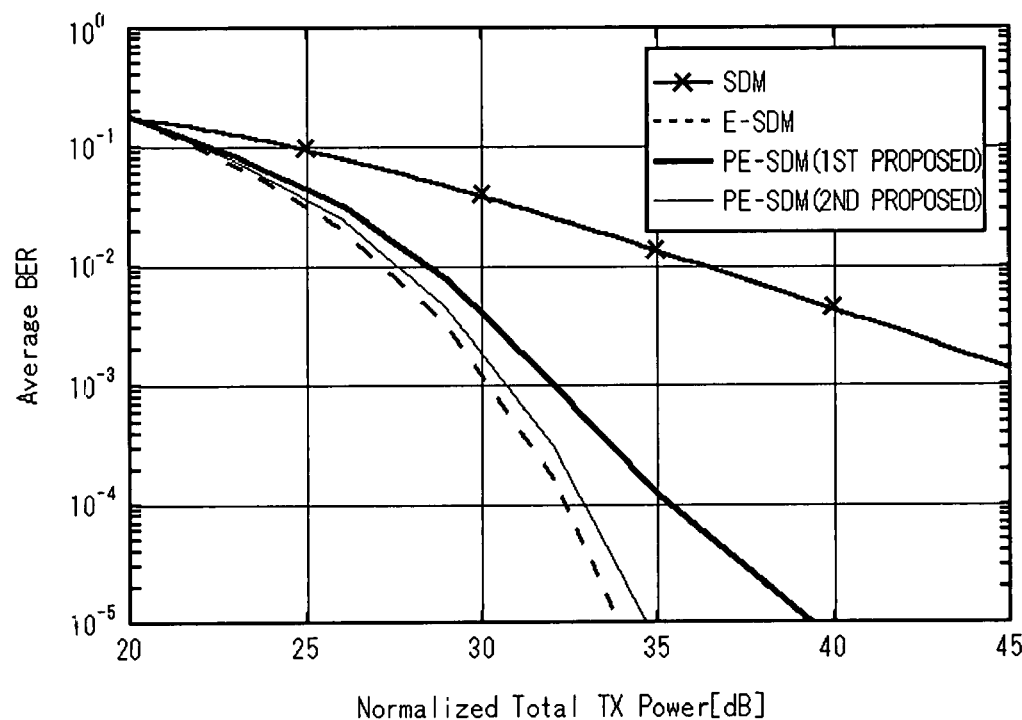

FIGS. 13A to 13D show transmission characteristics of the communication system 100. FIGS. 13A and 13B correspond to average error rate characteristics when no coding is performed. FIG. 13A corresponds to the 2×2 MIMO, whereas FIG. 13B corresponds to the 4×4 MIMO. The horizontal axis represents a normalized total amount of transmission power. This normalized total amount of transmission power is a value obtained in such a manner that the actual total amount of transmission power is normalized by the transmission power whose average Es/N0 becomes 0[dB] when one OFDM symbol was transmitted from a single antenna under a circumstance having the same statistical nature as the fading circumstance in this simulation. In FIGS. 13A to 13D, the transmission characteristic in a case when an eigenvector is used is denoted by E-SDM (Eigenbeam-SDM) and the transmission characteristic in a case when the proposed methods are used is denoted by PE-SDM (Pseudo E-SDM).

The deterioration in PE-SDM (second proposed method) relative to E-SDM is small, thus demonstrating a satisfactory characteristic. This is because $\lambda'_i(f)$ tends to take a value closer to eigenvalues and thus the weight vector has high correlation with the eigenvalues and consequently the channel can be transformed into a nearly orthogonalized form. On the other hand, as the power increases, the amount of deterioration in another PE-SDM (first proposed method) relative to E-SDM is large. As described earlier, the quality difference among the streams tends to be smaller in the first proposed method. As a result, it is anticipated that the transmission is so controlled that the increased number of streams are used when the power increases and consequently the interference at the receiving becomes larger.

Figure 13C:
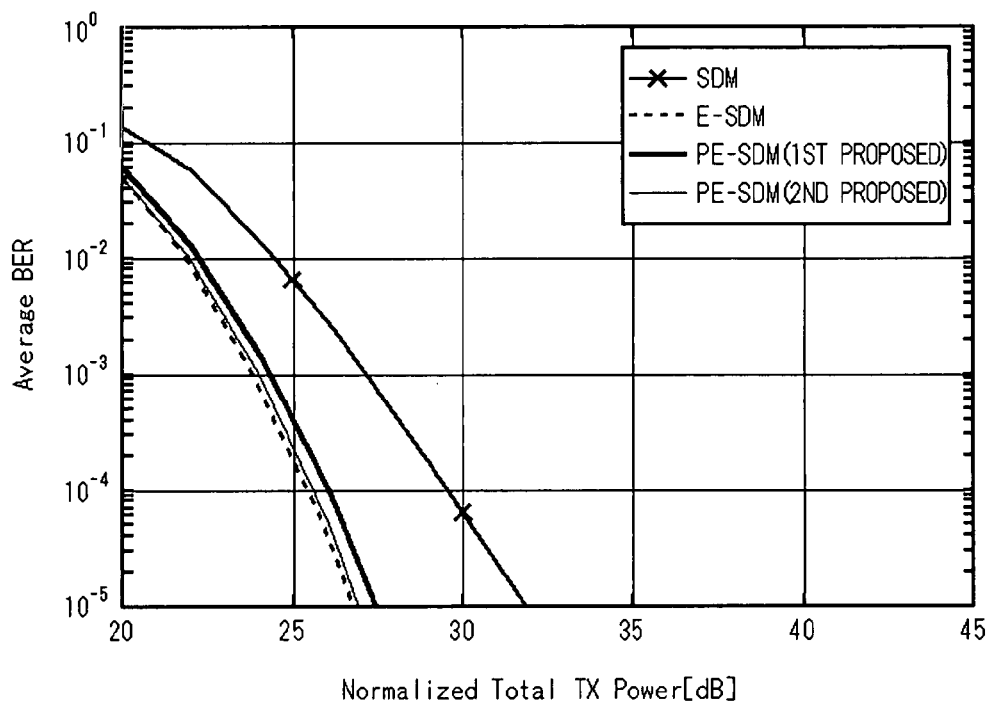
Figure 13D:
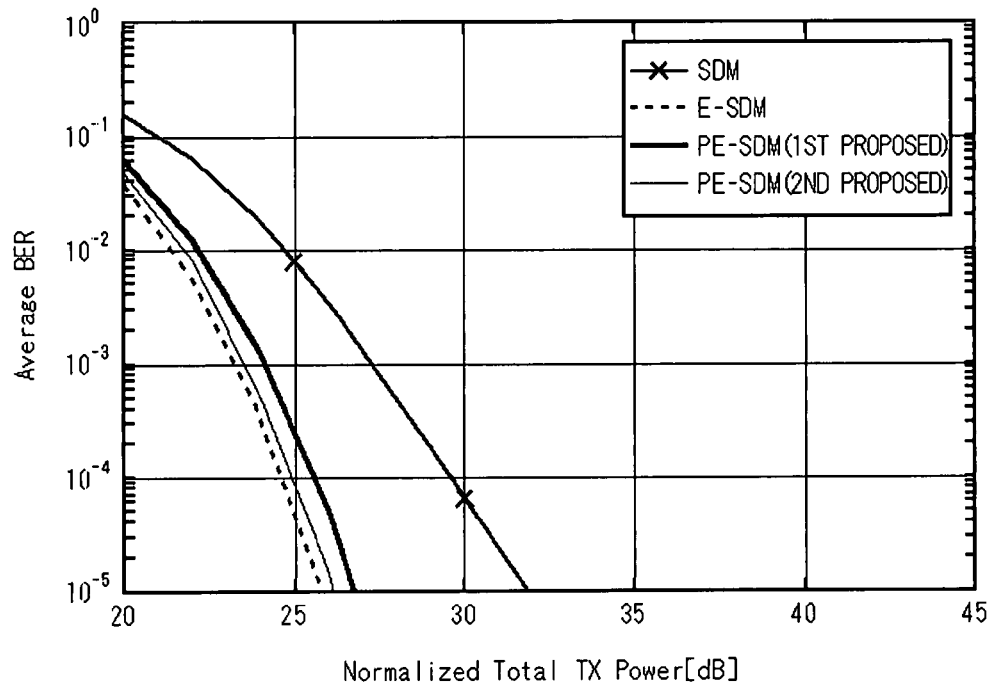

FIGS. 13C and 13D correspond to average error rate characteristics at the time of error correcting coding. FIG. 13C corresponds to the 2×2 MIMO, whereas FIG. 13D corresponds to the 4×4 MIMO. In the characteristics when no coding is performed, the PE-SDM (first proposed method 1) deteriorates relative to E-SDM (Eigenbeam-SDM). However, introducing the coding reduces the deterioration and the amount of deterioration relative to E-SDM is about 1 [dB] at maximum. This is because the deterioration of characteristics by the interstream interference is suppressed by the spatial interleaving. It is assumed in this simulation that an H matrix is transmitted and received and the H matrix is known. However, it is anticipated that when a channel where a transmission weight is multiplied at the receiving side is estimated in the time domain, an estimate obtained when the first proposed method is used will be more satisfactory than that obtained when the second proposed method is used. In an evaluation that contains the channel estimation results, it is possible that a difference in characteristics between the first proposed method and the second proposed method will be further reduced.

Figure 14:
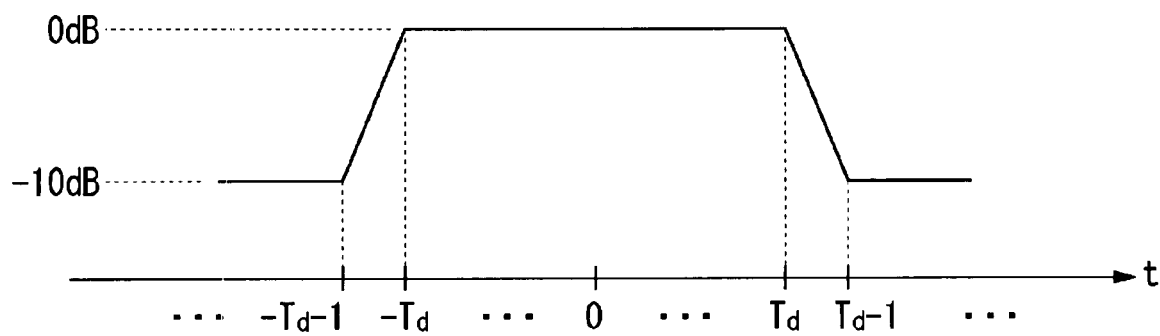
FIG. 14 shows characteristics of a time window function used in a baseband processing unit shown in FIG. 4.

In the proposed methods, if the following method is further applied to channel characteristic values in the frequency domain, the channel estimation accuracy can be enhanced. As described above, the impulse responses of the effective channel in the proposed methods converge on a range of |t|<Td and result in lower values in a range of |t|>Td. That is, it is considered that the estimates in the range of |t|>Td suffer from thermal noise. The baseband processing unit 22 here performs IFFT on channel characteristic values in the frequency domain and multiplies them by a window function in the time domain as shown in FIG. 14 so as to suppress the thermal noise in an interval of |t|>Td. Here, the window function has characteristics that suppress the intervals having much delay time. However, if there are subcarriers which are not used for communications like a guard band, the time response after the IFFT will be greatly distorted. In the light of this, effective channels in not-in-use subcarriers are interpolated before IFFT is performed. Here, for simplicity, assume that the frequency response is a periodic function, then a linear interpolation is carried out using estimates of subcarriers in the vicinity of the subcarriers in question.

An evaluation by the computer simulation is now presented here. A feedback of channel information in FDD, a channel estimation in a transmitter in TDD or the like is presupposed and it is assumed here that the channel information can be acquired ideally at a transmitting side. Also, it is assumed that the number of streams and the modulation schemes are known at a receiving side. A spatial filtering by a zero-forcing method is used to separate and detect: the streams in a receiver. Convolutional codes with constraint length 2 and coding rate ½ are used for error correcting coding, and a soft-decision Viterbi decoding is used for decoding. A soft-decision value of each bit is required for a soft-input decoding from an output of a spatial filter. Here, for simplicity, those closest to a receiving point among signal points whose bit is 1 or 0 are obtained respectively, and the square of the Euclidean distance thereof is used as a log likelihood.

Then, to equalize the reliability of the output of each filter obtained per subcarrier and per stream, the obtained log likelihood is weighted with the reciprocal of the squared Euclidean norm of each zero-forcing weight, namely a value corresponding to an SNR of the filter output. Here, the number of coding bits of each symbol assigned to each subcarrier is set to 8 and the transmission rate is fixed regardless of the number of antennas 12 and the number of antennas 14. Four patterns which are QPSK, 16-QAM, 64-QAM and 256-QAM are used as modulation schemes. Under this condition, a bit allocation and a power coefficient P are determined so that the average error rate of all streams after Viterbi decoding becomes minimum. Then a average value in a frequency domain of eigenvalues or pseudo eigenvalues is set as the quality of each stream.

Figure 15A:
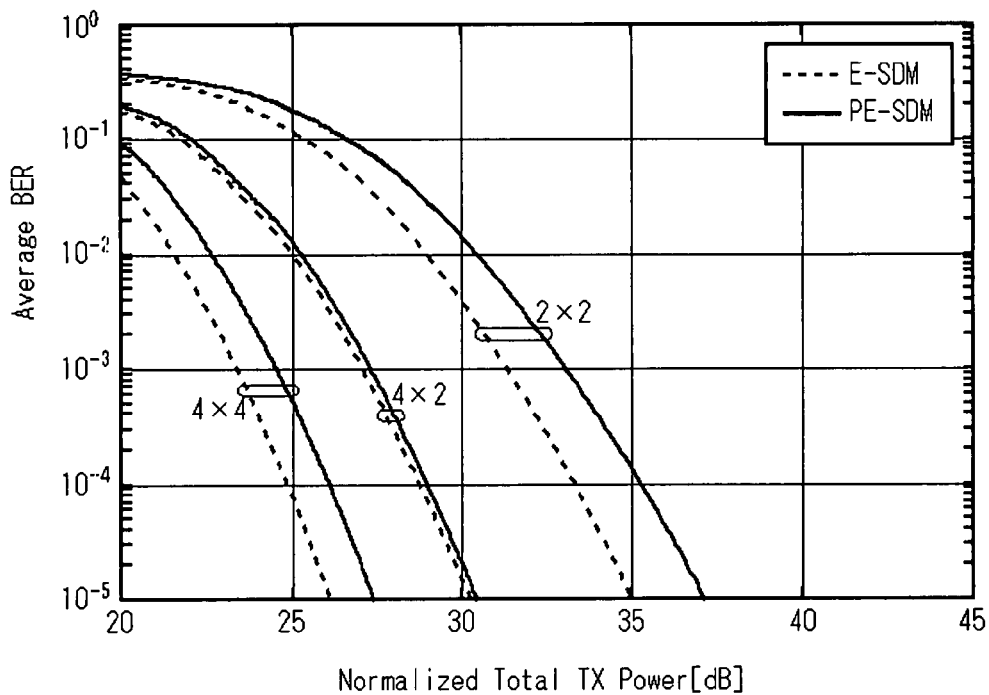
FIGS. 15A to 15D show transmission characteristics when a time window function of FIG. 14 is used.

FIGS. 15A to 15D show transmission characteristics when a time window function is used. FIG. 15A shows BER characteristics when effective channels are known at the receiving side. Evident from FIG. 15A, as the number of antennas 12 and the number of antennas 14 increase, both E-SDM and PE-SED improve. This is considered to be because the effect: of transmit/receive diversity is obtained as a result of increased number of antennas 12 and antennas 14. Here, PE-SDM corresponds to the first proposed method. Next, the characteristics of E-SDM and the characteristics of PE-SDM are compared with each other. Since E-SDM uses eigenweights where channels are orthogonalized in each subcarrier, an optimum beam space is formed no matter what MIMO structure is used and therefore satisfactory characteristics are obtained for E-SDM.

On the other hand, the transmission weights in PE-SDM do not completely orthogonalize channels, so that the reduction in gain as a result of the removal of interstream interference causes the characteristics to deteriorate as compared with E-SDM. The deterioration amount in PE-SDM in the error rate of $10^{-4}$ is about 2 dB in 2×2 MINO and about 1.2 dB in 4×4 MIMO. In contrast thereto, the deterioration amount is about 0.2 dB and therefore much smaller in 4×2 MIMO. At this time, because of a transmission resource control, both E-SDM and PE-SDM use two streams for transmission in 4×2 MIMO. However, the tendency in bit allocation differs between E-SDM and PE-SDM. Note that, in PE-SDM, a 16-QAM modulation signal is assigned to each stream for any of the channels. On the other hand, in E-SDM, a transmission pattern with 64-QAM modulation assigned to the first stream and QPSK modulation assigned to the second stream occupies about 20%. From this it is presumed that the characteristics of the first stream in E-SDM deteriorate due to the multi-level modulation and therefore the difference in characteristics from PE-SDM becomes smaller.

Figure 15B:
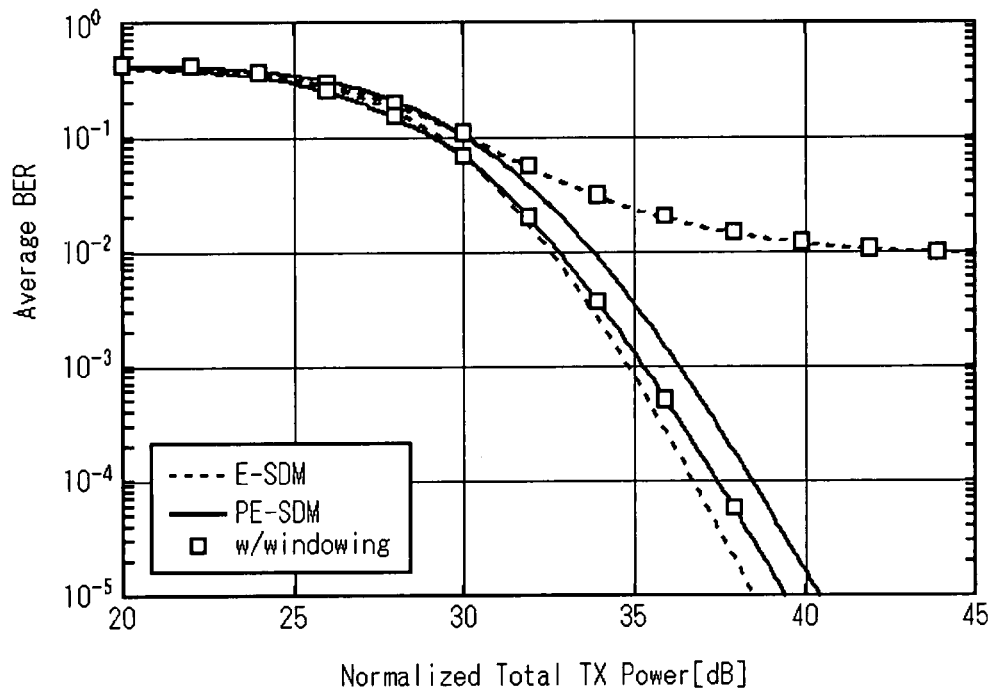
Figure 15C:
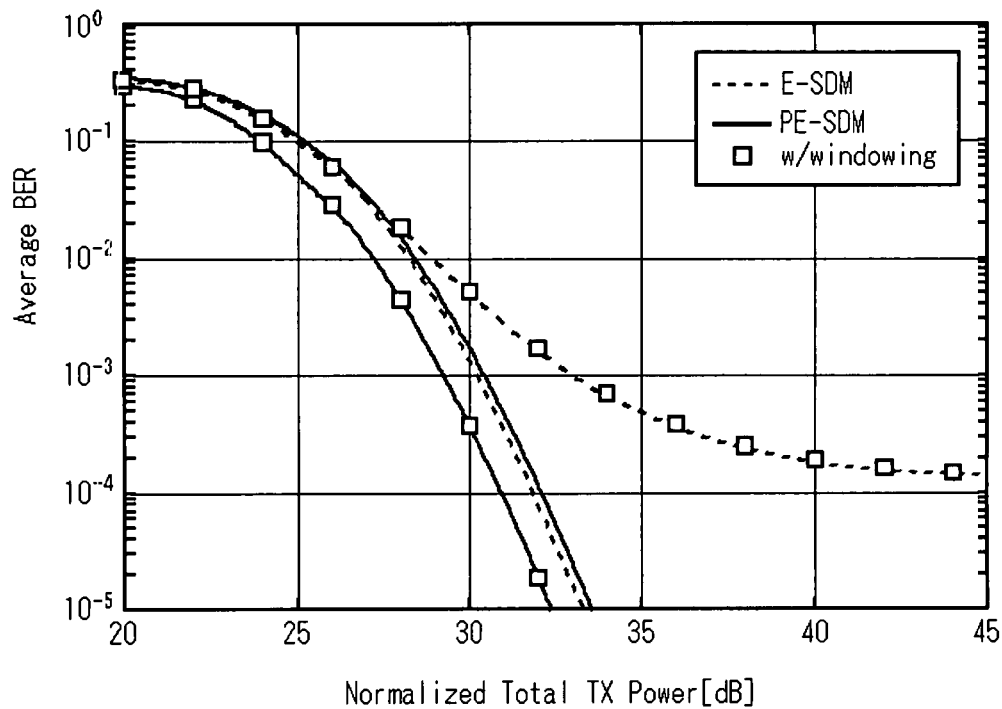
Figure 15D:
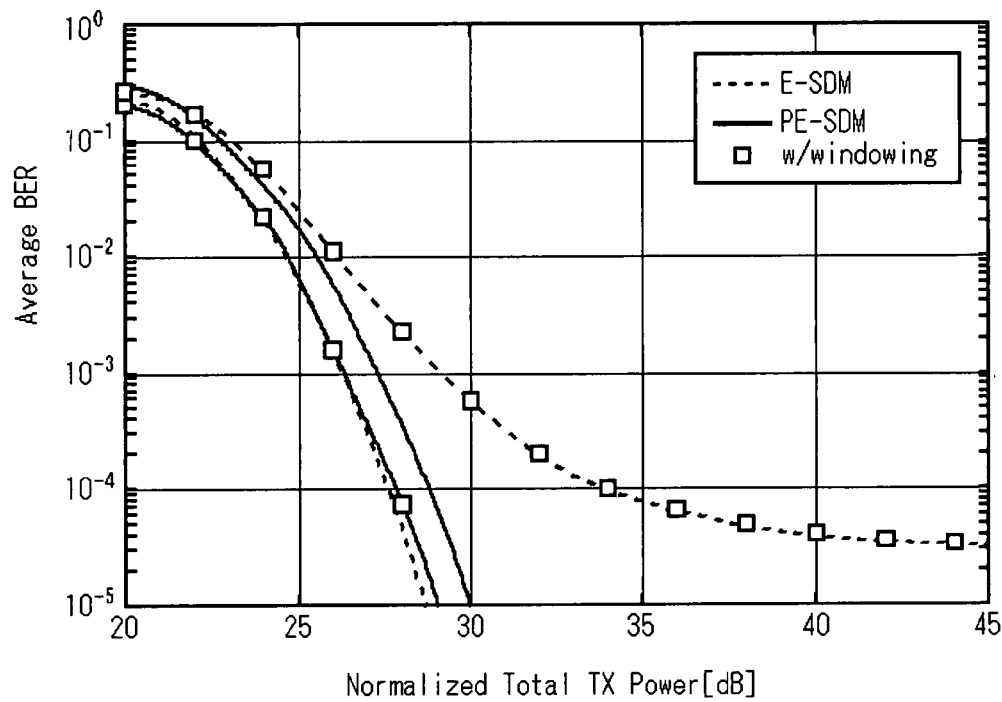

FIGS. 15B to 15D show BER characteristics at the time of channel estimation. FIG. 15B shows BER characteristics in the case of 2×2 MIMO; FIG. 15C shows the characteristics in the case of 4×2 MIMO; and FIG. 15D shows the characteristics in the case of 4×4 MIMO. The characteristics, in E-SD and PE-SD, obtained when the channel characteristics are estimated only in the frequency domain deteriorate by about 2 to 3 dB compared with the characteristics in FIG. 15A. On the other hand, when a time window is used for estimated channels, a floor is observed in E-SDM even if the error correcting is used. However, in PE-SDM, the characteristics are improved by about 1 to 1.5 dB as compared with a case where the window is not used. Thereby, PE-SDM indicates almost the same characteristic as E-SDM in 2×2 MIMO and 4×4 MIMO. In 4×2 MIMO, PE-SDM indicates characteristics superior to E-SDM. This is because thermal noise components contained in the estimated channels can be suppressed by the time window and therefore the estimation accuracy has improved.

According to the exemplary embodiments of the present invention, the weight vectors are derived, so that a steering matrix derived from the autocorrelation matrix that does not dependent on the frequency and said steering matrix does not depend on the frequency, either. Hence, the continuity of the weights in the frequency domain can be maintained even under a MIMO eigenmode transmission. Since the continuity of the weights are maintained, the delay spread of impulse responses in the time domain can be made smaller. Since the delay spread is made smaller, the signal components beyond the guard interval can be made smaller. Since the signal components beyond the guard interval is made smaller, the receiving characteristics can be enhanced. Since the continuity of the weights in the frequency domain is maintained, it becomes possible to perform the smoothing processing in the frequency domain. Since it becomes possible to perform the smoothing processing in the frequency domain, the receiving characteristics can be improved.

Also, since the eigenvalue decomposition is not performed subcarrier by subcarrier, the processing amount can be reduced. A matrix obtained when the Hermitian transpose of a channel matrix per subcarrier is multiplied by the steering matrix is to undergo the orthonormalization, and only one-time multiplication is executed. Hence, the processing amount can be reduced. Combined with the error correcting, the deterioration of the receiving quality can be suppressed while reducing the processing amount. Also, since the channel matrix is multiplied twice, the power method effect is obtained, so that weights closer to the eigenvectors can be derived.

The present invention has been described based on the exemplary embodiments. These are merely exemplary, and it is understood by those skilled in the art that various modifications to the combination of each component and each process thereof are possible and that such modifications are also within the scope of the present invention.

In the exemplary embodiments of the present invention, the second radio apparatus 10b, which receives packet signals finally, derives an H matrix and then conveys the derived H matrix to the first radio apparatus 10a. The mode of carrying out the present invention is not limited thereto and, for example, the H matrix may be derived from the signals, received by the first radio apparatus 10a, where eigenbeams are to be formed and, thereafter, the weight vector may be derived. This is effective in a case where TDD (Time Division Duplex) is in use. According to this modification, the notification of the H matrix is skipped and therefore the transmission efficiency can be improved. That is, it is only necessary that the first radio apparatus 10a which is to form eigenbeams can acquire the H matrix.

According to the exemplary embodiments of the present invention, the description has been given of a case when the number of multistreams is "4". However, this should not: be considered as limiting. For example, the number of a plurality of streams may be less than "4" or may be greater than "4". Along with this example, the number of antennas 12 may be less than "4" in the former case and may be greater than "4" in the latter case. In such cases, the number of streams contained in one group may be greater than "2" or the number of groups may be greater than "2". According to this modification, the present invention can be applied to a variety of the number of streams.

According to the exemplary embodiments of the present invention, a matrix where the orthogonality holds among components is shown representing the relation among codes of "HT-LTFs" in the training signals. However, this should not be considered as limiting and, for example, instead of components being orthogonal to each other, it suffices if a matrix has a code relation such that each desired component can be retrieved by a simple calculation like addition and/or subtraction. According to this modification, various sign relations can be used as a code of "HT-LTFs" in the training signals.

In the exemplary embodiments of the present invention, the baseband processing unit 22 performs Gram-Schmidt orthonormalization to derive the weight vectors. However, this should not be considered as limiting and, for example, the baseband processing unit 22 may perform orthogonalization other than the Gram-Schmidt orthonormalization and in particular may perform orthonormalization by which to maintain the continuity of channels in the frequency domain.

While the preferred embodiments of the present invention have been described using specific terms, such description is for illustrative purposes only, and it is to be understood that changes and variations may be made without departing from the spirit or scope of the appended claims.

What is claimed is:

1. A transmitting apparatus, comprising:
a plurality of transmitting antennas which transmit multi-carrier signals composed of a plurality of streams;
an acquisition unit which acquires, per carrier, a channel matrix having elements the number of which is determined by the number of said plurality of transmitting antennas and the number of a plurality of receiving antennas provided in a receiving apparatus wherein values of the elements represent channel characteristics between said plurality of transmitting antennas and the plurality of receiving antennas, respectively;
a first derivation unit including a means which derives a common autocorrelation matrix for the channel matrix acquired by said acquisition unit per carrier and a means which derives a steering matrix by eigenvalue-decomposing the derived common autocorrelation matrix;
a second derivation unit which derives, per carrier, weight vectors for a plurality of streams in a manner such that an orthonormalization is performed respectively on matrices obtained by operating the steering matrix derived by said first derivation unit on the channel matrix per carrier; and
a transmitter which transmits, from said plurality of transmitting antennas, the multicarrier signals composed of a plurality of streams by using the weight vectors derived by said second derivation unit.

2. A transmitting apparatus according to claim 1, wherein the common autocorrelation matrix and the steering matrix derived by said first derivation unit each has a dimension equal to the number of the plurality of the receiving antennas,
wherein said second derivation unit performs orthonormalization, for maintaining continuity of channels in a frequency domain, on a matrix where a Hermitian transpose of the channel matrix per carrier is multiplied by the steering matrix.

3. A transmitting apparatus according to claim 1, wherein the common autocorrelation matrix and the steering matrix derived by said first derivation unit each has a dimension equal to the number of the transmitting antennas,
wherein said second derivation unit performs orthonormalization, for maintaining continuity of channels in a frequency domain, on a matrix obtained as a result of multiplication by a Hermitian transpose of the channel matrix per carrier, the channel matrix per carrier and the steering matrix.

4. A method for deriving weight vectors, the method comprising:

acquiring, per carrier, a channel matrix having elements the number of which is determined by the number of a plurality of transmitting antennas and the number of a plurality of receiving antennas provided in a receiving apparatus wherein values of the elements represent channel characteristics between the plurality of transmitting antennas and the plurality of receiving antennas, respectively;

deriving a common autocorrelation matrix for the acquired channel matrix per carrier;

deriving a steering matrix by eigenvalue-decomposing the derived common autocorrelation matrix; and deriving, per carrier, weight vectors in a manner such that an orthonormalization is performed respectively on matrices obtained by operating the steering matrix on the channel matrix per carrier.

5. A method for deriving weight vectors according to claim 4, wherein the common autocorrelation matrix derived in said deriving a common autocorrelation matrix has a dimension equal to the number of the plurality of receiving antennas, wherein the steering matrix derived in said deriving a steering matrix has a dimension equal to the number of the plurality of receiving antennas, and wherein said deriving weight vectors per carrier performs orthonormalization, for maintaining continuity of channels in a frequency domain, on a matrix where a Hermitian transpose of the channel matrix per carrier is multiplied by the steering matrix.

6. A method for deriving weight vectors according to claim 4, wherein the common autocorrelation matrix derived in said deriving a common autocorrelation matrix has a dimension equal to the number of the plurality of transmitting antennas, wherein the steering matrix derived in said deriving a steering matrix has a dimension equal to the number of the plurality of transmitting antennas, and wherein said deriving weight vectors per carrier performs orthonormalization, for maintaining continuity of channels in a frequency domain, on a matrix obtained as a result of multiplication by a Hermite transpose of the channel matrix per carrier, the channel matrix per carrier and the steering matrix.

7. A communication system, comprising:

a transmitting apparatus which transmits multicarrier signals, composed of a plurality of streams, by a plurality of transmitting antennas; and a receiving apparatus which receives the multicarrier signals, composed of a plurality of streams, by a plurality of receiving antennas;

said transmitting apparatus including:

an acquisition unit which acquires, per carrier, a channel matrix having elements the number of which is determined by the number of the plurality of transmitting antennas and the number of a plurality of receiving antennas wherein values of the elements represent channel characteristics between the plurality of transmitting antennas and the plurality of receiving antennas, respectively;

a first derivation unit including a means which derives a common autocorrelation matrix for the channel matrix acquired by the acquisition unit per carrier and a means which derives a steering matrix by eigenvalue-decomposing the derived common autocorrelation matrix;

a second derivation unit which derives, per carrier, weight vectors for a plurality of streams in a manner such that an orthonormalization is performed respectively on matrices obtained by operating the steering matrix derived by the first derivation unit on the channel matrix per carrier; and a transmitter which transmits, from the plurality of transmitting antennas, the multicarrier signals composed of a plurality of streams by using the weight vectors derived by said second derivation unit.

* * * * *